United States Patent
Toyoda

(10) Patent No.: US 11,262,755 B2
(45) Date of Patent: Mar. 1, 2022

(54) DRIVER ASSISTANCE SYSTEM FOR AUTONOMOUSLY INDICATING VEHICLE USER INTENT IN RESPONSE TO A PREDEFINED DRIVING SITUATION

(71) Applicant: Toyota Motor Engineering & Manufacturing North America, Inc., Plano, TX (US)

(72) Inventor: Heishiro Toyoda, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 301 days.

(21) Appl. No.: 15/948,145

(22) Filed: Apr. 9, 2018

(65) Prior Publication Data
US 2019/0310633 A1     Oct. 10, 2019

(51) Int. Cl.
*G05D 1/00*     (2006.01)
*B60Q 1/04*     (2006.01)
(Continued)

(52) U.S. Cl.
CPC ............ *G05D 1/0088* (2013.01); *B60Q 1/04* (2013.01); *B60Q 1/50* (2013.01); *B60Q 5/005* (2013.01);
(Continued)

(58) Field of Classification Search
CPC ... B60Q 1/04; B60Q 1/26; B60Q 1/50; B60Q 5/005; B60W 2050/0066;
(Continued)

(56) References Cited

U.S. PATENT DOCUMENTS 8,255,144 B2   8/2012   Breed et al.
8,634,980 B1 *   1/2014   Urmson ................ B60W 50/14
                                                                701/23
(Continued)

FOREIGN PATENT DOCUMENTS

DE           10258617 A1     4/2004
DE    102014221759 A1     4/2016
(Continued)

*Primary Examiner* — Christopher Biagini
(74) *Attorney, Agent, or Firm* — Christopher G. Darrow; Darrow Mustafa PC

(57) ABSTRACT

A computing system for a vehicle includes one or more processors for controlling operation of the computing system, and a memory for storing data and program instructions usable by the one or more processors. The one or more processors are configured to execute instructions stored in the memory to determine when the vehicle is currently in a user-selected predefined driving situation and, responsive to the determination, control operation of the vehicle to implement a vehicle response mode associated with the user-selected predefined driving situation. The vehicle response mode may include an initial control mode specifying one or more initial indicators of the vehicle response mode, and a conditional secondary control mode specifying one or more secondary indicators of the vehicle response mode. The one or more initial indicators and the one or more secondary indicators are configured to be perceivable by a person exterior of the vehicle.

23 Claims, 10 Drawing Sheets

(51) Int. Cl.
*B60Q 5/00* (2006.01)
*B60W 50/16* (2020.01)
*B60W 50/08* (2020.01)
*B60Q 1/50* (2006.01)
*B60W 50/00* (2006.01)

(52) U.S. Cl.
CPC .......... *B60W 50/085* (2013.01); *B60W 50/16* (2013.01); *B60W 2050/0066* (2013.01); *G05D 2201/0213* (2013.01)

(58) Field of Classification Search
CPC ........... B60W 2050/146; B60W 30/00; B60W 50/082; B60W 50/085; B60W 50/14; B60W 50/16; G01S 13/865; G01S 13/867; G01S 17/86; G01S 2013/9316; G01S 2013/9322; G05D 1/0027; G05D 1/0061; G05D 1/0088; G05D 1/0234; G05D 1/0274; G05D 1/0278; G05D 2201/0213
See application file for complete search history.

(56) References Cited

U.S. PATENT DOCUMENTS

| | | | |
|---|---|---|---|
| 8,660,734 | B2 | 2/2014 | Zhu et al. |
| 8,788,134 | B1 | 7/2014 | Litkouhi et al. |
| 9,511,767 | B1 | 12/2016 | Okumura et al. |
| 9,868,391 | B1* | 1/2018 | Fairfield ................ G05D 1/021 |
| 9,902,311 | B2 | 2/2018 | Sweeney et al. |
| 2014/0358427 | A1* | 12/2014 | Fuhrman ............ G01C 21/3602 701/452 |
| 2015/0149017 | A1 | 5/2015 | Attard et al. |
| 2015/0336502 | A1* | 11/2015 | Hillis ...................... B60Q 1/26 701/23 |
| 2016/0046289 | A1 | 2/2016 | Elbs |
| 2016/0176397 | A1* | 6/2016 | Prokhorov ............ B60W 30/09 701/25 |
| 2016/0291854 | A1* | 10/2016 | Addati .................. H04L 67/306 |
| 2016/0304124 | A1* | 10/2016 | Fujiyoshi .............. G05D 1/0061 |
| 2017/0120904 | A1 | 5/2017 | Kentley et al. |
| 2017/0263098 | A1* | 9/2017 | Garcia .................. B60N 2/002 |
| 2018/0018875 | A1 | 1/2018 | Zhang et al. |
| 2018/0141492 | A1* | 5/2018 | Tokuda .................. G08G 1/162 |

FOREIGN PATENT DOCUMENTS

| | | |
|---|---|---|
| DE | 102016012774 A1 | 5/2017 |
| EP | 3366515 A1 | 8/2018 |
| WO | 2017068693 A1 | 4/2017 |

\* cited by examiner

Select predefined driving situation for autonomous response — 401

- another vehicle changing lanes from another lane to our lane
- one or more other vehicles stopped at an intersection at the same time as our vehicle — 403
- a pedestrian in the road ahead of our vehicle but not directly in the path of our vehicle — 405
- PREVIOUS SCREEN   [RESET]   [HOME]

FIG. 4A select vehicle response mode — 410
- enable computer selection of vehicle response mode — 411
- allow vehicle on our right to proceed first — 413
- allow vehicle on our left to proceed first — 415
- allow all other vehicles to proceed first
- allow left turning vehicle facing our vehicle in opposite lane to make his turn before we proceed — 417
- PREVIOUS SCREEN   [RESET]   HOME

FIG. 4B specify initial control mode indicators
- flash headlights (slower) — 421
- flash high beams (slower) — 423
- operate horn — 425 specify first time limit
  _ seconds — 427

- PREVIOUS SCREEN   [DONE]   HOME   [RESET]

FIG. 4C specify secondary control mode indicators — 431
- flash headlights (faster) — 433
- flash high beams (faster)
- operate horn — 435 specify second time limit
  _ seconds — 437

- PREVIOUS SCREEN   [DONE]   HOME

FIG. 4D

DRIVER ASSISTANCE SYSTEM FOR AUTONOMOUSLY INDICATING VEHICLE USER INTENT IN RESPONSE TO A PREDEFINED DRIVING SITUATION

TECHNICAL FIELD

The present disclosure relates to autonomous control of vehicles and, more particularly, to a system configurable by a vehicle user to autonomously control a vehicle in certain driving situations, in order to generate certain indicators perceivable by a human outside the vehicle and indicative of user intent in responding to a given driving situation.

BACKGROUND

Autonomous and semi-autonomous vehicles may me configured for self-driving without input from human operators in many driving situations. A vehicle user may wish to respond to a certain type of predefined driving situation in a consistent manner and with a specific intent. The user may desire to configure the vehicle to autonomously respond to the predefined driving situation in a consistent manner and/or to remind the user of the chosen manner of response.

SUMMARY OF THE INVENTION

In one aspect of the embodiments described herein, a computing system for a vehicle is provided. The computing system includes one or more processors for controlling operation of the computing system, and a memory for storing data and program instructions usable by the one or more processors. The one or more processors are configured to execute instructions stored in the memory to determine when the vehicle is currently in a user-selected predefined driving situation and, responsive to a determination that the vehicle is currently in the user-selected predefined driving situation, control operation of the vehicle to implement a vehicle response mode associated with the user-selected predefined driving situation. The vehicle response mode may include an initial control mode specifying one or more initial indicators of the vehicle response mode, and a conditional secondary control mode specifying one or more secondary indicators of the vehicle response mode. The one or more initial indicators and the one or more secondary indicators are configured to be perceivable by a person exterior of the vehicle.

In another aspect of the embodiments described herein, a computer-implemented method is provided for controlling a vehicle to generate one or more indicators of a vehicle response mode to be implemented by the vehicle responsive to a determination that the vehicle is currently in a user-selected predefined driving situation. The method includes steps of: determining that the vehicle is currently in a user-selected predefined driving situation; determining a vehicle response mode to be implemented in response to the determination that the vehicle is currently in the user-selected predefined driving situation; implementing an initial control mode specifying one or more initial indicators of the vehicle response mode; and conditionally implementing a secondary control mode specifying one or more secondary indicators of the vehicle response mode. The one or more initial indicators and the one or more secondary indicators are configured to be perceivable by a person exterior of the vehicle.

BRIEF DESCRIPTION OF THE DRAWINGS

The accompanying drawings, which are incorporated in and constitute a part of this specification, illustrate embodiments described herein and together with the description serve to explain principles of embodiments described herein.

FIG. 4A is a schematic view of an example embodiment of an interactive HMI (human-machine interface) screen operable to enable user selection of predefined driving situations, in accordance with embodiments described herein.

FIG. 4B is a schematic view of an example embodiment of an interactive HMI screen operable to enable user selection of predetermined vehicle response modes, in accordance with embodiments described herein.

FIG. 4C is a schematic view of an example embodiment of an interactive HMI screen operable to enable user selection of predetermined initial indicators of a selected vehicle response mode, in accordance with embodiments described herein.

FIG. 4D is a schematic view of an example embodiment of an interactive HMI screen operable to enable user selection of predetermined secondary indicators of a selected vehicle response mode, in accordance with embodiments described herein.

DETAILED DESCRIPTION

Figure 1:
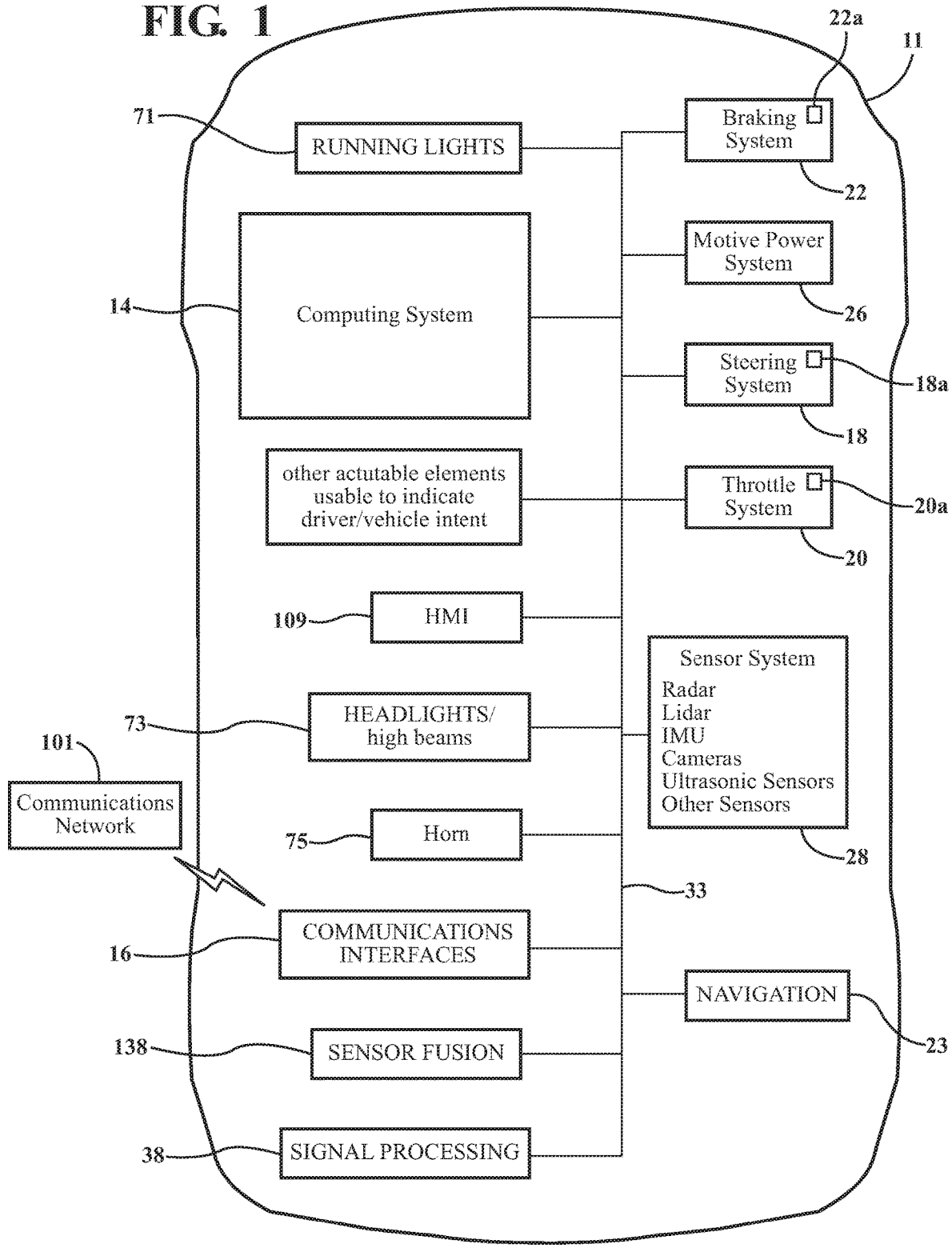
FIG. 1 is a schematic block diagram of a vehicle incorporating a system configured for generating one or more indicators of a vehicle response mode to be implemented by the vehicle responsive to a determination that the vehicle is currently in a user-selected predefined driving situation, in accordance with an embodiment described herein.

Embodiments described herein relate to a vehicle computing system configurable by a user to control a vehicle to respond in a particular manner when the vehicle is in a predefined driving situation. In a first operational mode, a user may select one or more predefined driving situation(s) to which the vehicle will automatically respond when the vehicle encounters the driving situation(s). The user may also select a vehicle response mode which will be implemented by the vehicle in responding to a given driving situation. The user may also select initial indicators that will be autonomously generated by the vehicle for use in implementing the user-selected vehicle response mode and indicating to a person exterior of the vehicle the intended response to the driving situation. The user may also select the secondary indicators that will be autonomously generated by the vehicle computing system for use in implementing the user-selected vehicle response mode and further indicating to the person exterior of the vehicle the intended response to the driving situation. These selections may be made and stored by a user prior to the vehicle encountering the associated predefined driving situation. In a second operational mode, the vehicle response mode and the initial and secondary indicators may be selected by a computing system when the vehicle encounters a predefined driving situation or detects when the vehicle may be entering a predefined driving situation. The vehicle response mode and the initial and secondary indicators may be selected based on the type of driving situation, vehicle operational factors, and vehicle environmental factors. In the second operational mode, the computing system may control the vehicle to generate haptic feedback to a human driver, to urge the human driver to control the vehicle to generate one or more of the initial and/or secondary indicators of the vehicle response mode.

The user may configure the vehicle computing system to control various aspects of vehicle operation to convey, to a person exterior of the vehicle, the manner in which the user wishes to respond to the predefined driving situation. The predefined driving situation may involve the person exterior of the vehicle as a driver of another vehicle or as a pedestrian, for example. A vehicle response mode may become associated with a predefined driving situation when the vehicle response mode is elected as a response to the driving situation, either by a user or by a computing system as described herein. The vehicle computing system may be configured to enable user selection of any one of multiple vehicle response modes associated with the user-selected predefined driving situation, to provide a predetermined vehicle response mode which may be implemented by a computing system when the vehicle is in an associated predefined driving situation. After selecting a vehicle response mode, the user may select one or more initial indicators and secondary indicators of the response mode. The response mode and the indicators may be selected so as to reflect the intent of the user in responding to the predefined driving situation. The computing system controls elements of the vehicle (for example, headlights, brakes, throttle) to generate the various indicators. Generation of the indicators is intended to convey, to the person exterior of the vehicle, the intent of the user in responding to the driving situation, so that the person exterior of the vehicle may react in an expected or user-desired manner to the user's intentions. The initial indicators may be automatically generated as soon as it is determined that the vehicle is in the associated predefined driving situation. The secondary indicators may be generated if, after passage of a predetermined time period, the vehicle is determined to still be in the predefined driving situation (i.e., if it is determined that the person exterior of the vehicle has not reacted in a user-anticipated manner to the initial indicators). If the person exterior of the vehicle does not react in the desired manner within a certain time period, control of the vehicle may transfer back to a default vehicle control routine (for autonomous operation of the vehicle) or to a human driver (if the vehicle is operating in a manual or semi-autonomous driving mode.

FIG. 1 is a schematic block diagram of a vehicle incorporating a system configured for generating one or more user-selected predetermined indicators of a selected vehicle response mode to be implemented by the vehicle responsive to a determination that the vehicle is currently in a user-selected predefined driving situation. The vehicle 11 may take the form of a car, truck, or any other vehicle capable of performing the operations described herein. The vehicle 11 may be configured for autonomous operation, and may operate in a fully or partially autonomous mode. While in an autonomous mode, the vehicle 11 may be configured to operate without human interaction. For example, in an autonomous mode in which operation of the vehicle 11 is autonomously controlled to implement a selected vehicle response mode associated with a user-selected predefined driving situation as described herein, the vehicle may be controlled to operate the throttle, braking, headlights, and/or other vehicle systems and elements so as to generate various indicators of a selected vehicle response mode associated with the predefined driving situation. These indicators may be generated without input from a vehicle occupant during the period when the vehicle is in the predefined driving situation. The vehicle 11 may also be configured for completely autonomous driving operations (i.e., for self-driving, without the presence of a driver or driver input) from a start location to a given destination along a route determined by a navigation unit or system 23, for example.

The vehicle 11 may include various systems, subsystems and components in operative communication with each other, such as a sensor system or array 28, a computing system 14, one or more communications interfaces 16, a steering system 18, a throttle system 20, a braking system 22, a motive power system 26, and other systems and components needed for operating the vehicle as described herein. The vehicle 11 may include more or fewer subsystems than those shown in FIG. 1, and each subsystem could include multiple elements. Further, each of the subsystems and elements of vehicle 11 may be interconnected. Performance of one or more of the described functions of the vehicle 11 may be executed by multiple vehicle systems and/or components operating in conjunction with each other. The various vehicle systems may be controlled by (or may otherwise interact with) the computing system 14.

FIG. 1 also shows a schematic arrangement of primary control sub-systems 18, 20 22, 26 of the vehicle 11 configured to enable full or partially autonomous control of the vehicle 11, for the purposes described herein. The primary control sub-systems may be communicatively coupled to computing system 14, sensor system 28, navigation system 23, and other systems and/or components of the vehicle as needed via a suitable CAN bus 33 or using any other suitable method, whether wired or wireless.

A "primary control sub-system" is a system designed to effect control and operation of one of the primary vehicle controls (i.e., brake, steering, throttle, and motive power), as described herein. Each of primary control sub-systems 18, 20 22, 26 may be configured for fully or partially autonomous operation under the direction of an associated controller (not shown) specialized for the control of the sub-system. For example, a braking system 22 may include a braking system controller (not shown) and various actuatable elements (brakes, etc.) (not shown) necessary for executing braking control commands, and which are configured to be operable responsive to control commands received from the braking controller. Steering system 18 may include a steering system controller (not shown) in operative communication with associated actuatable steering components (not shown) necessary for executing steering control commands. Throttle system 20 may include a throttle controller (not shown) in operative communication with associated actuatable throttle components (not shown) necessary for executing throttle control commands. Motive power system 26 may include a motive power system controller (not shown) in operative communication with associated actuatable motive power components (not shown) necessary for executing motive power control commands. Alternatively, one or more of the primary control sub-systems 18, 20 22, 26 may be configured for full or partially autonomous control by vehicle computing system 14. Each of the primary control sub-systems 18, 20 22, 26 may also be configured for control by vehicle computing system 14 for purposes of implementing vehicle control commands for generating one or more indicators of a selected vehicle response mode as described herein. The vehicle embodiment shown in FIG. 1 includes four primary control sub-systems (a steering control system 18, a braking control system 22, a throttle control system 20, and a motive power control system 26). FIG. 1 shows just a few examples of vehicle sub-systems 18, 20, 22, 26 which may be incorporated into a vehicle. A particular vehicle may incorporate one or more of these systems or other systems (not shown) in addition to one or more of the systems shown.

The steering system 18 may include such elements as the vehicle wheels, servo-mechanisms, gears, steering knuckles, and/or any other elements or combination of elements (including any computer system-controllable mechanisms or elements) that may be operable to enable autonomous adjustment of the heading of vehicle 11. The motive power system 26 may include components operable to provide powered motion for the vehicle 11. In an example embodiment, the motive power system 26 may include an engine (not shown), an energy source (such as gasoline, diesel fuel, or a one or more electric batteries in the case of a hybrid vehicle), and a transmission (not shown). The braking system 22 may include any combination of elements and/or any computer system-controllable mechanisms configured to decelerate the vehicle 11. The throttle system 20 may include elements and/or mechanisms (for example, an accelerator pedal and/or any computer system-controllable mechanisms configured to control, for instance, the operating speed of the engine and, in turn, control the speed of the vehicle 11.

In one or more arrangements, various elements of the vehicle 11 may be configured to be controllable by vehicle computing system 14 so as to enable the generation of haptic feedback to a human driver. For example, elements of the primary control sub-systems 18, 20 22, 26 may be configured to be controllable by vehicle computing system 14 so as to enable the generation of haptic feedback to the driver. The haptic feedback provided to the driver may represent (and may be consistent with) initial and/or secondary control commands that the computing system is seeking to implement to generate associated initial and secondary indicators of an intended vehicle response mode, responsive to a detected predefined driving situation. This haptic feedback may be directed to informing the driver of the nature of the command the computing system 14 seeks to implement, and may also be directed to guiding the actions of the driver, so that the driver is urged by the haptic feedback to implement the command and/or to acquiesce to execution of the command by the vehicle computing system. In this manner, the haptic feedback may also aid in preventing the human driver from executing a control command that is contrary to or inconsistent with a vehicle response mode selected by the computing system 14 for guiding response of the vehicle 11 to the predefined driving situation.

In one example, the driver may receive haptic feedback through the throttle control system 20 via the accelerator pedal (i.e., the vehicle computing system 14 may control physical actuation of the accelerator pedal 20a in a manner consistent with a throttle command configured to implement aspects of the vehicle-selected response mode, so as to provide haptic feedback to the driver). This operation of the accelerator pedal may be perceived by the driver as a haptic indicator of an action the driver should take in order to implement a control command which reflects a computer-selected vehicle response mode. The driver may adjust his pressure on the accelerator pedal responsive to this haptic feedback.

In another example, the driver may receive haptic feedback through the braking system 22 via the brake pedal (i.e., the vehicle computing system 14 may control physical actuation of the brake pedal in a manner consistent with a braking command configured to implement aspects of the vehicle-selected response mode, so as to provide haptic feedback to the driver). The driver may adjust his pressure on the brake pedal responsive to this haptic feedback.

In another example, the driver may receive haptic feedback through the steering system 18 via the steering wheel (i.e., the vehicle computing system 14 may operate to exert control forces on the steering wheel to help guide the wheel in a manner consistent with steering commands configured to implement aspects of the vehicle-selected response mode, so as to provide haptic feedback to the driver). The driver may adjust the angle of the steering wheel responsive to this haptic feedback.

Examples of specific systems and/or capabilities which may be incorporated into the vehicle 11 to facilitate autonomous vehicle control include adaptive cruise control, electronic stability control, automated lane centering, forward collision warning, lane departure warning, and blind spot monitoring. Additional controls, systems and/or capabilities may be provided if needed to perform the functions described herein, depending on the design of a particular vehicle. Vehicle embodiments described herein are assumed to include sufficient autonomous systems and/or capabilities to autonomously execute all of the commands needed to perform one or more vehicle maneuvers or otherwise respond to a predefined driving situation for which a vehicle response mode may be selected by a user or by computing system 14.

The vehicle may be capable of autonomously (i.e., without human input) generating indicators of a selected vehicle response mode, including performing any vehicle maneuvers which may serve as an indicator of the vehicle response mode.

In one or more arrangements, various systems and/or elements of the vehicle may be autonomously controllable by computing system 14, by a controller (not shown), or by other means to generate one or more indicators of the selected vehicle response mode. For example, various light-or-sound generating elements of the vehicle may be autonomously controllable to generate one or more indicators of the selected vehicle response mode. In one aspect, vehicle headlights 73 and/or high beam lights may be controllable to blink or intermittently flash on and off at different rates to indicate the selected vehicle response mode to a person exterior of the vehicle 11.

Similarly, the vehicle running lights 71 may be controllable to blink or intermittently flash on and off at different rates to indicate the selected vehicle response mode to a person exterior of the vehicle 11. In addition, the vehicle horn 75 may be controllable to indicate the selected vehicle response mode to a person exterior of the vehicle 11.

In one or more arrangements, primary vehicle controls such as throttle control system 20 and braking system 22, for example, may be controlled to indicate a selected vehicle response mode to a person exterior of the vehicle 11. Also, any other element or system of the vehicle which may be used to generate a human-perceivable indicator of a selected vehicle response mode may be configured for autonomous operation or control by the vehicle, responsive to selection and/or specification by a user or computing system 14 of an operating mode for the vehicle system or element.

Figure 2:
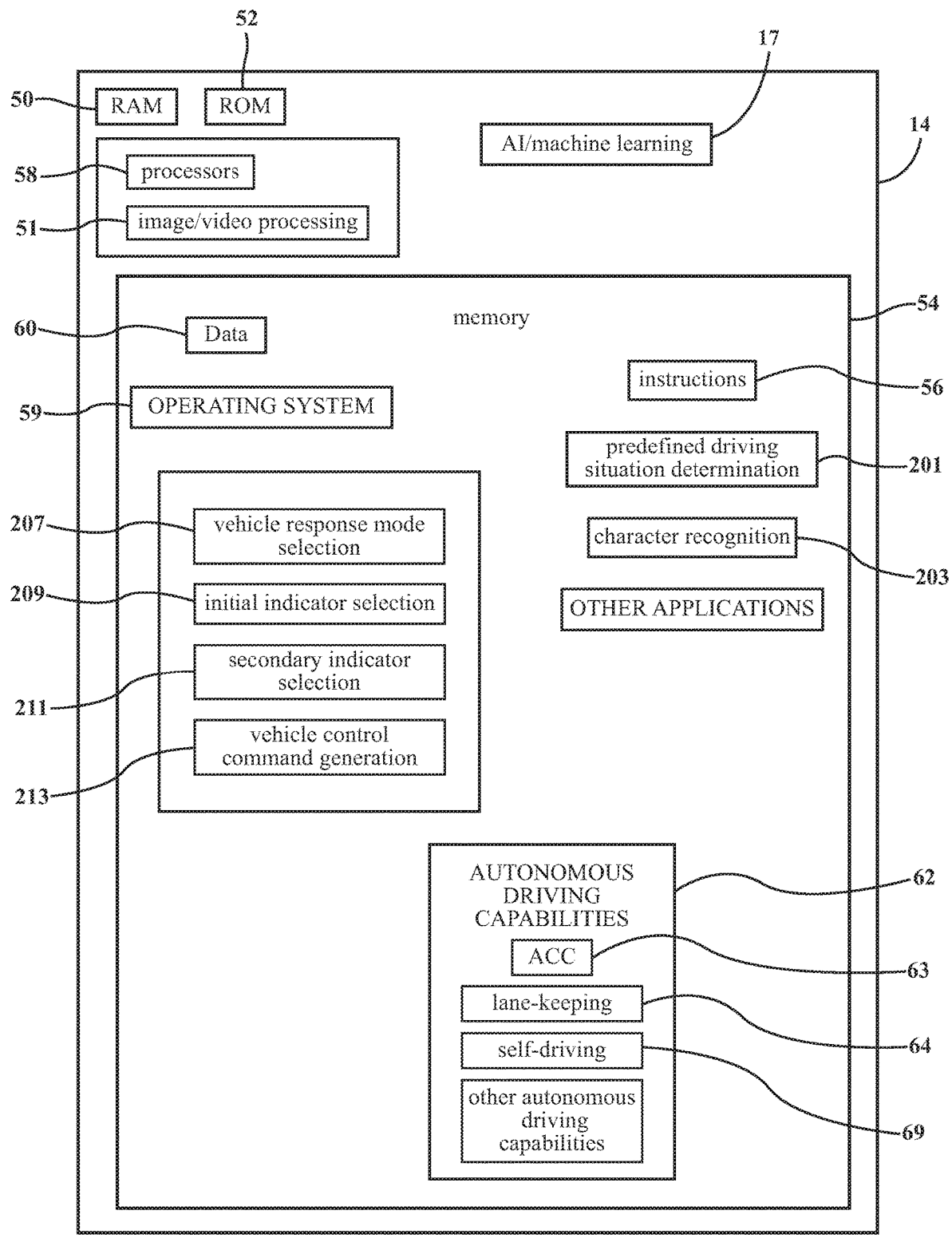
FIG. 2 is a block diagram of a vehicle computing system 14 according to one or more illustrative embodiments of the disclosure.

FIG. 2 is a block diagram of a vehicle computing system 14 that may be used according to one or more illustrative embodiments of the disclosure. The computing system 14 may be operatively connected to the other vehicle systems and elements and otherwise configured so as to affect partial or fully autonomous control and operation of the vehicle 11 and its components as described herein. The computing system 14 may control the functioning of the vehicle 11 based on inputs and/or information received from various subsystems (e.g., motive power system 26, sensor system 28, steering system 18, etc.), from any of the communications interfaces 16, from sensor system 28, and/or from any other suitable source of information. The computing system 14 may have some or all of the elements shown in FIG. 2. In addition, the computing system 14 may also include additional components as needed or desired for particular applications.

The computing system 14 may include one or more processors 58 for controlling overall operation of the computing system 14 and its associated components, including RAM 50, ROM 52, an input/output module or human-machine interface (HMI) 109, computer-readable storage or memory 54, and any other elements. Computing system 14 may execute instructions stored in a non-transitory computer readable medium, such as memory 54. "Processor" means any component or group of components that are configured to execute any of the processes and/or process steps described herein or any form of instructions to carry out such processes/process steps or cause such processes/process steps to be performed. The processor(s) 58 may be implemented with one or more general-purpose and/or one or more special-purpose processors. Examples of suitable processors include microprocessors, controllers, microcontrollers, DSP processors, and other circuitry that can execute software. In the context of this document, a computer-readable storage medium may be any tangible medium that can contain or store a program for use by or in connection with an instruction execution system, apparatus, or device. The processor(s) 58 can include at least one hardware circuit (e.g., an integrated circuit) configured to carry out instructions contained in program code. In arrangements in which there is a plurality of processors 58, such processors can work independently from each other or one or more processors can work in combination with each other. In one or more arrangements, the processor(s) 58 can be a main processor of the vehicle 11. The computing system 14, along with any additional computing systems (e.g., any specialized primary sub-system controllers) (not shown) and other devices may correspond to any of multiple systems or devices configured as described herein for functions such as autonomously (i.e., without vehicle operator or occupant input) operating the entire vehicle or specific portions of the vehicle.

Computing system 14 may be configured to act as an autonomous vehicle controller, performing functions such as controlling (or assisting in coordinated control of) all autonomous driving operations, including steering, braking, etc. Computing system 14 may also be configured to operate (and/or coordinate operation of) the various vehicle systems and components so as to execute various autonomous commands or maneuvers, such as lane changes, merges, and turns, for example. Computing system 14 may also be configured to receive and store information from the sensor array 15 and/or from any other vehicle components pertaining to operation of the vehicle. The computing system 14 may also be configured to receive and store the information so that all of the information is time-correlated and may be processed for diagnostic purposes.

The memory 54 may comprise one or more computer-readable memories. A computer-readable storage or memory 54 may include any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media may include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

The memory 54 may contain data 60 and/or instructions 56 (e.g., program logic) executable by the processor(s) 58 to execute various functions of the vehicle 11. The memory 54 may contain additional instructions as well, including instructions to transmit data to, receive data from, interact with, or control one or more of the vehicle systems and/or components described herein (for example, motive power system 26, sensor system 28, computing system 14, and the communication interfaces 16). In addition to the instructions 56, the memory 54 may store data such as roadway maps, path information, among other information. Such information may be used by the vehicle 11 and the computer system 14 for route planning and otherwise during the operation of the vehicle 11 in autonomous, semi-autonomous, and/or manual modes.

The computing system 14 may be configured to coordinate control of the various actuatable vehicle systems and components so as to implement one or more autonomous driving capabilities (generally designated 62), including vehicle control capabilities such as a self-driving capability 69 and/or various autonomous driving assistance capabilities. These autonomous capabilities 62 may be stored in memory 54 and/or in other memories and implemented in the form of computer-readable program code that, when executed by a processor, implement one or more of the various processes, instructions or functions described herein. Any of the various capabilities described herein may be embodied in software, suitable hardware, and/or a combination of both hardware and software. A driving assistance capability may be defined as a capability which assists a driver in operating the vehicle by performing one or more functions which may be performed by the driver if the capability is absent or deactivated. Examples of driving assistance capabilities include adaptive cruise control (ACC) 63 and lane-keeping 64. A self-driving capability may be defined as an ability of the vehicle to perform all of the driving operations required to autonomously (i.e., without human input or interaction) drive the vehicle from a first or start location to a predetermined destination. The various autonomous driving assistance capabilities described herein may be part of the self-driving capability 69, or the various autonomous driving assistance capabilities described herein may be activated or utilized by the self-driving capability 69 to control the vehicle to drive the vehicle from a first or start location to the predetermined destination.

An adaptive cruise control capability (ACC) 63 may be defined as a cruise control system that automatically adjusts the vehicle speed to maintain a safe distance from vehicles ahead, based in information from onboard vehicle sensors. Thus, responsive to inputs from the vehicle sensors, for example, the computing system 14 may control the throttle system, braking system, motive power system and any other pertinent systems as required to implement the ACC functions. An autonomous lane keeping capability 64 may be defined as a system designed to monitor a relative position of the vehicle with respect to the boundaries of a traffic lane in which the vehicle is traveling, and to control the throttle system, steering system, any other pertinent systems as required to maintain the vehicle 11 in the current lane. The lane boundaries may be detected by vehicle sensors or by any other suitable method. In addition, elements of the autonomous lane keeping capability 64 and various sensors usable for the lane keeping function may be usable in detecting or determining a target lane into which a vehicle is to be autonomously steered pursuant to a lane change or traffic merging operation, as described herein.

The computing system 14 may be configured to autonomously operate the vehicle 11 so as to drive the vehicle from a start location to a destination or end location located remotely from the start location, using self-driving capability 69. U.S. application Ser. No. 14/789,004, the disclosure of which is incorporated herein by reference in its entirety, describes methods and systems usable for controlling an autonomously operable vehicle while traveling from a start location to a designated end location. An autonomous vehicle configured as described in the '004 application may be operable (in conjunction with the navigation unit or system 23) to drive the vehicle along a designated route between the start and end locations. The computing system 14 may be configured to (responsive to inputs to the navigation system from sensors 28, such as cameras) operate the vehicle 11 in accordance with traffic lights and traffic signs along the planned route and to perform any other operations and functions necessary for self-driving the vehicle between the start and end locations. In one or more arrangements, the computing system 14 described herein can incorporate artificial or computational intelligence elements, e.g., neural network, or other machine learning algorithms, generally designated 17. Further, in one or more arrangements, the hardware and/or software elements configured for performing particular functions or operations described herein may be distributed among a plurality of elements and/or locations. In addition to computing system 14, the vehicle may incorporate additional computing systems and/or devices (not shown) to augment or support the control functions performed by computing system 14, or for other purposes.

Information from sensors and other sources in the vehicle and exterior to the vehicle may be processed and used to control various vehicle systems and components. For example, various road condition sensors may be provided to supply information to the computing system 14 to enable the computing system to process the road condition information in accordance with stored processor-executable instructions, and to formulate appropriate control commands to the steering, throttle, and braking systems. The computing system 14 may continuously receive and process an ongoing or continuous flow of information from sensor system 28 and from other information sources. This information may be processed and/or evaluated in accordance with instructions stored in a memory, in a manner and for the purposes described herein. The use of "continuously" when referring to the reception, gathering, monitoring, processing, and/or determination of any data, information or other parameters described herein means that the computing system 14 is configured to receive and/or process any information relating to these parameters as soon as the information exists or is detected, or as soon as possible in accordance with sensor acquisition and processor processing cycles.

In embodiments described herein, the vehicle computing system 14 may be configured to determine when the vehicle is currently in a user-selected predefined driving situation. The computing system may be configurable by a user to, responsive to a determination that the vehicle is currently in a user-selected predefined driving situation, autonomously control operation of portions of the vehicle to implement a selected vehicle response mode associated with the user-selected predefined driving situation. The selected vehicle response mode may include an initial control mode and a conditional secondary control mode. The initial control mode may specify one or more initial indicators of the selected vehicle response mode. In one or more arrangements, the initial indicators may be user-selected. Alternatively, the initial indicators may be selected by the computing system 14. The conditional secondary control mode may specify one or more secondary indicators of the selected vehicle response mode. The secondary indicators may be implemented if certain conditions are satisfied. In one or more arrangements, the secondary indicators may be user-selected. Alternatively, the secondary indicators may be selected by the computing system 14. In addition, the one or more initial indicators and the one or more secondary indicators are configured to be perceivable by a person exterior of the vehicle.

As used herein, the term "perceivable" is understood to mean detectible by one or more human senses, such as sight or hearing. The person exterior of the vehicle may be, for example, a pedestrian or an occupant of another vehicle on the road near the user's vehicle. The vehicle response mode and/or initial and secondary indicators specified for the initial and secondary control modes described herein may be "predetermined" in that these parameters may have been selected by a user prior to the vehicle entering an associated predefined driving situation. The predefined driving situations, the vehicle response modes, and the various indicators which may be associated with the vehicle response modes may be stored in the computing system 14 for selection by a user, for example, from a menu. The user may be a current occupant of the vehicle 11 (i.e., the ego-vehicle) and/or someone who has selected one or more predefined driving situations to which the vehicle 11 has been directed to respond. After selection by the user, these parameters may be stored in a memory for autonomous implementation by the computing system when it is determined that the vehicle is in the associated predefined driving situation.

A "predefined driving situation" is a driving situation which the vehicle may encounter, for example, during normal operation. A predefined driving situation may be defined by and may be identifiable by various characteristics and parameters, the values of which may be stored in a memory for continuous comparison with a current driving situation of the vehicle, to aid in determining as soon as possible when the vehicle is in the predefined driving situation. In one or more arrangements, a predefined driving situation may be "user-selected" by a user choosing a predefined driving situation (for example, from a menu) to which the vehicle 11 is to respond by autonomously implementing a predetermined user-selected vehicle response mode associated by the user with the predefined driving situation, in a manner described herein. The predefined driving situation to which the vehicle will respond may be selected from a touch screen menu or by other means, prior to the vehicle encountering the driving situation.

In one or more arrangements, a predefined driving situation may also be "user-selected" by a user choosing a predefined driving situation (for example, from a menu) to which the vehicle 11 is to respond by the computing system 14 selecting a vehicle response mode for guiding the vehicle response to the predefined driving situation, in a manner described herein. In implementing the computer-selected vehicle response mode, the computing system 14 may autonomously control certain operations of the vehicle to generate initial and (if needed) secondary indicators of the response mode. The computing system may also control elements of the vehicle to generate haptic feedback to a human driver as described herein, to urge and/or remind the driver to execute control commands (for example, braking) designed to provide indicators of the vehicle response mode to a person residing exterior of the vehicle 11.

Figure 7A:
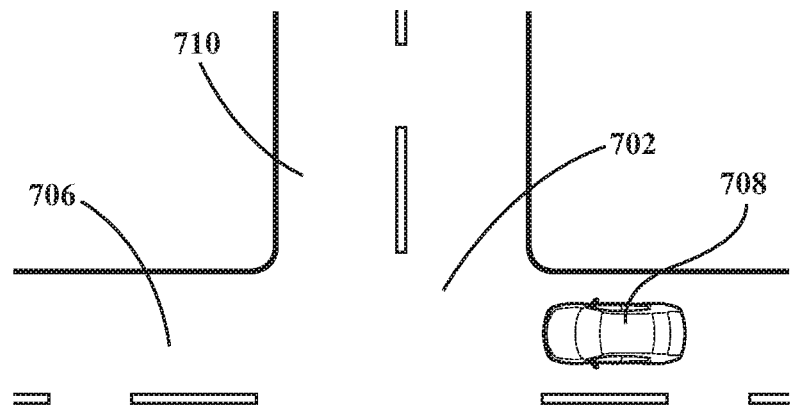
FIG. 7A is a plan schematic view showing a third example of a predefined driving situation to which a vehicle 11 may be configured to respond.

A vehicle response mode may comprise one or more vehicle control commands configured to convey, to a person exterior of the vehicle, an intent of the user (or a purpose of the vehicle) in responding to an associated predefined driving situation involving the person exterior of the vehicle. In one example of implementation of the system, the vehicle 11 may encounter a driving situation in which it is stopped at an intersection along with another vehicle residing on a cross street (as shown in FIG. 7A, for example). Prior to encountering this driving situation, the user may select this driving situation from a menu and select a vehicle response mode which the vehicle 11 may autonomously execute whenever the vehicle is in the predefined driving situation. In one example, the intent of the user may be to let the other vehicle proceed through the intersection before the vehicle 11 proceeds through the intersection. In this case, the user may select (or "predetermine"), for implementation by the vehicle 11, a vehicle response mode configured to indicate this intent to a person driving the other vehicle. The vehicle response mode which will be implemented by the vehicle 11 may be selected from a touch screen menu or by other means, prior to the vehicle 11 encountering the driving situation.

An initial control mode may comprise one or more initial indicators which are to be generated by the vehicle as an initial indication of a selected vehicle response mode. The initial indicators may comprise one or more user-selected initial indicators which are to be autonomously generated by the vehicle as an initial indication of a user-selected vehicle response mode. Alternatively, the initial indicators may comprise one or more computer-selected initial indicators which may be autonomously generated by the vehicle and/or which may be generated by a human driver responsive to haptic feedback generated by the vehicle computing system. The haptic feedback may prompt, remind, and/or urge the human driver to operate the vehicle 11 to generate the desired indicators. An indicator may be an operation of the vehicle by the computing system 14 or by a human driver which is perceivable by a person exterior of the vehicle and configured to convey to the person an intended response to a predefined driving situation involving the person. The initial control mode may specify initial indicators which will be generated in response to a determination that the vehicle 11 is currently in an associated predefined driving situation. Initial indicators are the first indicators that will be generated responsive to a determination that the vehicle is currently in the predefined driving situation.

As an example, in one or more arrangements, the vehicle computing system 14 may be configured to execute instructions stored in the memory to autonomously control the vehicle to intermittently flash vehicle headlights on and off at a first rate as an initial indicator of a selected vehicle response mode. As another example, the computing system may be configured to execute instructions stored in the memory to autonomously control the vehicle to intermittently flash vehicle running lights on and off at a first rate as an initial indicator of the selected vehicle response mode.

As another example, the computing system may be configured to execute instructions stored in the memory to autonomously control the vehicle to stop the vehicle as an initial indicator of a selected vehicle response mode. In one or more arrangements, the computing system may be configured to execute instructions stored in the memory to autonomously control the vehicle to operate a horn of the vehicle as an initial indicator of a selected vehicle response mode.

The secondary control mode may specify secondary indicators which will be generated after the initial indicators. Implementation of a secondary control mode may be conditional; that is, the secondary control mode may only be implemented if one or more conditions are met. For example, in one or more arrangements, a secondary control mode may be implemented responsive to a determination that the vehicle is still in a predefined driving situation after expiration of a first predetermined time period following initiation of implementation of an initial control mode. In such cases, it may be assumed that the person exterior of the vehicle 11 to which the initial indicators are directed has not perceived the initial indicators or, for some other reason, has failed to act in an anticipated or user-desired manner in response to the initial indicators. For example, the vehicle 11 and another vehicle may both be stopped at an intersection. Initial indicators may be generated by the vehicle 11 to indicate to a person exterior of the vehicle 11 (such as a driver of the other vehicle) that the user desires for the other vehicle to proceed through the intersection while the vehicle 11 waits. A subsequent failure of the other vehicle to start to proceed through the intersection within a certain time period after initiation of generation of the initial indicators (i.e., initiation of implementation of the initial control mode) may trigger implementation of the secondary control mode and its associated secondary indicators.

The secondary indicator(s) may be configured to emphasize the intent expressed by the previously-implemented initial indicators. In one or more arrangements, and as described in the examples set forth herein, the secondary control mode may specify secondary indicator(s) which, when implemented, act to either (a) continue or repeat generation of the initial indicators; (b) change the rate or intensity of generation of one or more of the initial indicators; or (c) add additional indicators or otherwise revise the number and/or nature of the generated indicators.

As an example, in one or more arrangements, the computing system may be configured to execute instructions stored in the memory to autonomously control the vehicle to intermittently flash the vehicle headlights on and off at a second rate greater than a first rate used as an initial indicator, as a secondary indicator of a selected vehicle response mode. As another example, the computing system may be configured to execute instructions stored in the memory to autonomously control the vehicle to intermittently flash the vehicle running lights on and off at a second rate greater than a first rate, as a secondary indicator of a selected vehicle response mode.

In one or more arrangements, the computing system may be configured to execute instructions stored in the memory to autonomously control the vehicle to maintain the vehicle in a stopped condition as a secondary indicator of a vehicle response mode. Also, in one or more arrangements, the computing system 14 may be configured to execute instructions stored in the memory to autonomously control the vehicle to operate a horn of the vehicle as a secondary indicator of a selected vehicle response mode.

The computing system 14 may be configured to generate one or more vehicle control commands configured to generate the various indicators by operating or controlling pertinent portions of the vehicle. Thus, a user-selected or computer-selected vehicle response mode associated with a user-selected predefined driving situation may be implemented by implementing the initial control mode and (optionally) the secondary control mode associated with the selected vehicle response mode. The initial control mode may be implemented by executing vehicle control commands which generate the initial indicators, and the secondary control mode may be implemented by executing vehicle control commands which generate the secondary indicators.

The computing system may be configured to identify, generate and/or implement all vehicle commands needed to generate the initial and secondary indicators. Thus, the nature of the commands for the needed for the initial control mode and the secondary control mode may be determined by user selection or computer selection of the initial and secondary indicators. Therefore, the initial control mode and the secondary control mode are effectively selected by user selection or computer selection of the associated initial and secondary indicators.

Referring again to FIG. 2, embodiments of the vehicle computing system 14 described herein may incorporate (or may have access to) a predefined driving situation determination capability 201 configured to detect and/or determine when the vehicle 11 is in or approaching any of one or more predefined driving situations selected by a user. The driving situation determination capability 201 may be configured to determine whenever the vehicle 11 is currently in a predefined driving situation.

The vehicle may be configured by the user as described herein to respond to each predefined driving situation in a user-selected manner, as described herein. Alternatively, and as also described herein, the vehicle computing system may select a vehicle response mode and associated initial and secondary indicators that will be used to respond to the predefined driving situation.

As described herein, the computing system 14 (using the predefined driving situation determination capability 201) may be configured to enable user selection (for example, using HMI 109) of one or more predefined driving situations to which the vehicle 11 will respond. The computing system 14 (using the predefined driving situation determination capability 201) may be configured to determine or detect when the vehicle is currently in any of the predefined driving situations for which the vehicle may be configured to autonomously respond.

In one or more arrangements, a predefined driving situation may be identifiable by and/or defined by values of pertinent sensor data parameters, detectible conditions in the vehicle environment, and/or other measurable parameters. For example, pertinent parameter values may have predetermined ranges defined such that, when values of the pertinent sensor data parameters fall within the predetermined ranges, the vehicle 11 will be determined by computing system 14 to be in an associated predefined driving situation. In one or more arrangements, the detection of certain conditions in the vehicle environment may also serve to indicate that the vehicle 11 is in one of the user-selected predefined driving situations.

Non-exclusive examples of predefined driving situations to which the vehicle 11 may be programmed to respond may include a situation where another vehicle is attempting to change lanes from another lane to the lane in which the vehicle 11 is currently driving, a situation where the vehicle 11 and one or more other vehicles are stopped at an intersection at the same time, and a situation where a pedestrian is standing in the road ahead of the vehicle 11 but not directly in the path of the vehicle. Other predefined driving situations and user-selectable predetermined responses thereto may also be incorporated into computing system 14.

Records of user-selectable predefined driving situations including conditions and sensor data parameter values defining one or more user-selectable predefined driving situations and/or other situation recognition factors detectible by the vehicle sensors and/or other means may be stored in a memory of computing system 14 or accessible by the computing system, for use in determining when the vehicle 11 is in one of the predefined driving situations. Alternatively, the conditions and sensor data parameter values defining one or more predefined driving situations may be stored in an off-vehicle or remotely located memory. Also, the various capabilities described herein and used for enabling user-selection of predefined driving situations, user-selection of associated response modes, and/or generation of vehicle control commands may reside off-vehicle at one or more processing facilities (not shown). In such cases, the HMI 109 may provide an interface enabling interaction between the user and the various capabilities via communications interfaces 16 and a suitable communications network 101. Data and information determinative of the existence of a predefined driving situation may be continuously gathered by sensors 28 and may be continuously transmitted to the processing facility(ies) for interpretation and formulation of vehicle control commands for generating associated indicators, if it is determined that the vehicle 11 is in a predefined driving situation. Generated control commands may be transmitted to the vehicle 11 via communications network 101 for implementation by the vehicle computing system 14. This process may occur continuously, in real time, while the vehicle is in the predefined driving situation.

User selection of the predefined driving situation(s) and initial and secondary indicators as shown and described with respect to FIGS. 4A-4D may also be performed using vehicle HMI 109 in communication with computing system 14 or a remote or off-vehicle computing system (not shown). The ability to select and perform the predefined driving situation response functions described herein using a remote computing system enables the predefined driving situation response capabilities described herein to be utilized without retrofitting or incorporating them into a vehicle computing system (such as computing system 14).

A predefined driving situation determination capability may also be configured to determine (with as much advance notice as possible) when the vehicle is approaching or will encounter any of the predefined driving situations for which the vehicle may be configured to autonomously respond. The predefined driving situation determination capability 201 may also be configured to determine or estimate when the vehicle will encounter a predefined driving situation. The ability to determine or detect (with as much advanced notice as possible) a situation where the vehicle 11 is approaching or will encounter a predefined driving situation enables communication links between the vehicle 11 and the remote predefined driving situation determination capability and any associated command generation facilities to be established prior to the actual need for vehicle control commands responsive to the predefined driving situation. This may facilitate resolution of possible wireless or other communications issues. For example, situations such as stopping at a four-way intersection may be determined ahead of time by reference to a planned route formulated by a navigation system. This determination may enable suitable communications links to be established between the vehicle and any off-vehicle facilities prior to entering a predefined driving situation. In other cases, a sudden or unexpected occurrence of a predefined driving situation may arise, in which case the vehicle computing system 14 may determine the need for and establish communication with the predefined driving situation determination capability and any associated command generation facilities as soon as possible.

The record of predefined driving situations may include parameters, circumstances, and/or other situation recognition factors detectible by the vehicle sensors and/or other means, which may be used to help define each predefined driving situation and to aid the computing system (such as vehicle computing system 14) in identifying each driving situation as soon as possible. Also, various characteristics of a planned route may be available to the vehicle computing system 14 through the navigation system 23. Alternatively, the vehicle 11 may be equipped with cameras, an image/video processing capability, and character-recognition capability 203 configured for reading road signs and extracting therefrom information which may relate to predefined driving situation for which remote input may be requested. In one example, a road sign indicating that the vehicle 11 is approaching a four-way intersection may be unexpectedly encountered by the vehicle 11. The vehicle sensors 28 and computing system 14 may be configured to detect and interpret such a sign (for example, using a character recognition capability 203 of the computing system 14). If needed, the computing system 14 may then initiate communications with remote facilities in case control commands responsive to a predefined driving situation may be needed.

The vehicle computing system 14 may incorporate (or have access to) a vehicle response mode selection capability 207. The computing system 14 (through the vehicle response mode selection capability 207) may be configured to enable user selection of a vehicle response mode associated with a selected predefined driving situation, in response to user selection of the predefined driving situation. Any user selections as described herein may be made using HMI 109, for example. Also, as described in greater detail below, the computing system 14 (using the vehicle response mode selection capability 207) may also be configured to select or determine a vehicle response mode to be implemented responsive to a predefined driving situation.

The vehicle computing system 14 may incorporate (or have access to) an initial indicator selection capability 209. The computing system 14 (through the initial indicator selection capability 209) may be configured to enable user selection of at least one initial indicator to be autonomously generated by vehicle implementation of one or more associated initial vehicle control commands in accordance with a selected vehicle response mode.

The computing system 14 (through the initial indicator selection capability 209) may also be configured to enable selection by the computing of at least one initial indicator to be generated as part of a selected vehicle response mode. One or more initial indicator(s) may be generated by the vehicle computing system 14 by vehicle implementation of one or more associated initial vehicle control commands. One or more initial indicator(s) may also be generated by a human driver responsive to haptic feedback to the human driver.

The vehicle computing system 14 may incorporate (or have access to) a secondary indicator selection capability 211. The computing system 14 (through the secondary indicator selection capability 211) may be configured to enable user selection of at least one secondary indicator to be autonomously generated by conditional vehicle implementation of one or more associated secondary vehicle control commands, in accordance with a selected vehicle response mode. The computing system 14 (through the secondary indicator selection capability 211) may also be configured to enable selection by the computing system of at least one secondary indicator to be generated as part of a selected vehicle response mode. One or more secondary indicator(s) may be generated by the vehicle computing system 14 by vehicle implementation of one or more associated initial vehicle control commands. One or more secondary indicator(s) may also be generated by a human driver responsive to haptic feedback to the human driver.

The vehicle computing system 14 may incorporate (or have access to) a vehicle control command generation capability 213. The vehicle control command generation capability 213 may be configured to generate vehicle control commands directed to generating the initial and secondary indicators selected by a user or by a computing system. Responsive to user selection of a vehicle response mode and initial and secondary indicators, suitable vehicle control commands and command strings may be generated and stored prior to the need for the commands to be implemented. In cases where the vehicle response mode is selected by a computing system (such as computing system 14), the computing system may also select initial and secondary indicators to be used to indicate the selected vehicle response mode. Selection of the vehicle response mode and initial and secondary indicators by the computing system may be done in real time or close to real time, responsive to vehicle operational status and environmental conditions as described elsewhere herein.

In one or more arrangements, the computing system 14 may be configured to inform a user of vehicle 11 (for example, via HMI 109) that the vehicle 11 appears to be approaching (or is currently in) a user-selected predefined driving situation for which a user-selected vehicle response mode has been chosen. The computing system 14 may be configured to inform the user of the nature of the user-selected vehicle response mode and any associated user-selected indicators. The computing system 14 may be configured to enable the user to disable implementation of the vehicle response mode, for example by voice command or touch screen on the HMI 109. In arrangements where the vehicle 11 appears to be approaching (or is currently in) a user-selected predefined driving situation and the computing system 14 is to select the vehicle response mode and associated initial and secondary indicators, the computing system 14 may be configured to inform a user of the predefined driving situation and to enable the user to forego selection of a vehicle response mode by the computing system. This may enable the user to exercise full control over the vehicle during the predefined driving situation.

In one or more arrangements, the computing system 14 may also be configured to enable a user override or interrupt of implementation of any in-process implementation of a vehicle response mode, including generation of any initial or secondary indicators. The user interrupt may act to halt implementation of the response mode as soon as the interrupt is selected by a user. Then, control may transfer to the default vehicle control routine (in block 350) or to the human driver (in block 1350), depending on whether the vehicle is being driven in an autonomous mode or a manual mode.

In one or more arrangements, an interactive interrupt prompt may be displayed on the HMI 109 as soon as implementation of a vehicle response mode is initiated. Alternatively, any other suitable method may be provided for enabling the user to select the user interrupt of the vehicle response mode. Then, at any time during implementation of the response mode, a user may activate the interrupt, thereby halting vehicle implementation of the vehicle response mode. The user may activate the interrupt, for example, if the user determines that the intended vehicle response mode is not effectively conveying the user intention to the person outside the vehicle, or is the user is tired of waiting for the expected response from the person outside the vehicle.

In an embodiment where the computing system is generating haptic feedback to a human driver to prompt or urge the driver to control the vehicle in a specific manner to generate indicators, the computing system may continue to generate the haptic feedback even after activation of the interrupt. This may enable the computing system to continue to provide instructions, guidance, and/or education to the driver regarding a course of action the computing system determines should be followed responsive to an associated predefined driving situation. However, after activation of the user interrupt, a human driver receiving the haptic feedback may have full control of the vehicle, and the vehicle 11 may no longer automatically or autonomously generate the indicators or otherwise implement a vehicle response with which the indicators are associated.

In one or more arrangements, activation of the user interrupt may cancel implementation of only the currently in-process vehicle response mode. Any subsequent vehicle response modes implemented due to subsequent predefined driving situations may not be affected. Any cancellation of a subsequent vehicle response mode may be done by activating the user interrupt again, during implementation of the subsequent vehicle response mode.

In situations where it is not possible to establish communications with a remote facility for purposes of determining whether or not vehicle 11 is currently in a user-selected predefined driving situation or for purposes of generating or determining suitable vehicle control commands responsive to a driving situation, the computing system 14 may be configured to control the vehicle 11 in accordance with a suitable default control routine (for example, a default autonomous vehicle control routine) (not shown). If the vehicle is being operated manually, control of the vehicle may remain with a human driver.

The default vehicle control routine may be stored in a vehicle memory. The default vehicle control routine may be a control routine by which the vehicle may be normally autonomously controlled autonomously during normal vehicle use, apart from user-selection of any predefined driving situation and vehicle response mode. The default vehicle control routine may be configured to control the vehicle 11 in all predefined driving situations which have not been selected by a user for response using a predetermined vehicle response mode. Thus, if a user has pre-selected a predefined driving situation and an associated predetermined vehicle response mode as described herein, vehicle control may transfer from a default vehicle control routine when it is determined that the vehicle is in the user-selected predefined driving situation. In such a case, the vehicle may be controlled in accordance with the selected vehicle response mode until the vehicle 11 is no longer in the user-selected predefined driving situation or until expiration of one or more predetermined time periods as described herein.

Vehicle AI/machine learning capabilities 17 may also be configured to evaluate current vehicle and environmental conditions prior to autonomous implementation of a user-selected vehicle response mode or user-selected initial and/or secondary indicators, as previously described. Because the user-selected vehicle response modes may be discretionary based on preferences of a user, the computing system may, under certain conditions, forego implementation of a vehicle response mode selected by the user. For example, as already described, a user may elect to forego implementation of a previously selected vehicle response mode in a given driving situation, by disabling implementation of the vehicle response mode.

In addition, if the vehicle is in situation (such as icy or low visibility conditions) where it may be inadvisable to slow or stop unnecessarily, the computing system 14 may elect not to respond to a detected predefined driving situation by implementing a user-selected vehicle response mode directed specifically to the driving situation. For example, vehicle AI/machine learning capabilities 17 may be configured to evaluate such factors as vehicle mechanical condition (for example, brake wear), other vehicle operational parameters, road and weather conditions, and other vehicle environmental conditions as derived from sensor data, for purposes of estimating the safety of a possible vehicle response mode to a given predefined driving situation. Vehicle AI/machine learning capabilities 17 may also be configured to compare the current vehicle operational status and environmental conditions to such conditions existing when a given vehicle response mode was implemented in the past, to estimate a likelihood of success if the contemplated vehicle response mode is implemented, or the likelihood of success of a specific initial or secondary indicator in conveying a desired intent to a driver of another vehicle in the driving situation. The computing system may store or have access to statistics and other information relating to the past success rate of implementing a vehicle response modes, initial indicators, and secondary indicators under various driving conditions.

Vehicle communications interfaces 16 may be configured to establish and enable continued and uninterrupted interaction between the vehicle 11 and external sensors, other vehicles, other computer systems, various external computing and communications systems and networks (such as communication network 101, a satellite system, a cellular phone/wireless communication system), and also off-vehicle facilities incorporating one or more of the capabilities described herein, and useable for performing one or more of the functions described herein.

Vehicle computing system 14 may operate (via vehicle communications interfaces 16) in a networked environment supporting connections to one or more remote computers, such as other computing systems, terminals and/or mobile devices (e.g., mobile phones, short-range vehicle communication systems, vehicle telematics devices and vehicle-to-vehicle communications systems)(not shown). Any other computing systems or devices in the vehicle and any related terminals or devices in operative communication with vehicle computing system 14 may include devices installed in vehicles, mobile devices that may travel within vehicles, or devices outside of vehicles that are configured to receive and process vehicle and driving data. Thus, any terminals or devices in communication with the computing system 14 may each include personal computers (e.g., laptop, desktop, or tablet computers), servers (e.g., web servers, database servers, etc.), and other terminals or devices.

The communications interfaces 16 may include interfaces enabling communication in a wide area network (WAN), a wireless telecommunications network, and/or any other suitable communications networks (such as or including network 101, for example). The communication network(s) can include wired communication links and/or wireless communication links. The communication network(s) can include any combination of the above networks and/or other types of networks. The communication network(s) can include one or more routers, switches, access points, wireless access points, and/or the like. In one or more arrangements, the communication network(s) can include Vehicle-to-Everything (V2X) technologies (including Vehicle-to-Infrastructure (V2I) and Vehicle-to-Vehicle (V2V) technologies), which can allow for communications between any nearby vehicle(s), and between the vehicle 11 and any nearby roadside communications nodes and/or infrastructure.

When used in a WAN networking environment, the vehicle computing system 14 may include (or be operatively connected to) a modem or other means for establishing communications over the WAN, such as network (e.g., the Internet). When used in a wireless telecommunications network, the computing system 14 may include (or be operatively connected to) one or more transceivers, digital signal processors, and additional circuitry and software for communicating with wireless computing systems (not shown) via one or more network devices (e.g., base transceiver stations) in the wireless network. These configurations provide various ways of receiving a constant flow of information from (and transmitting a constant flow of information to) various external sources. The communications interfaces 16 may be incorporated into the computing system 14 or may be located spaced apart from the computing system and communicatively coupled to the computing system.

Vehicle navigation module or system 23 may include, for example, a known navigation system receiver (for example, a GPS receiver) configured to receive vehicle location information from a GPS system or other source. However, vehicle navigation system 23 may have any alternative form or configuration suitable for the purposes described herein. Vehicle navigation system 23 may also be configured to operatively communicate with computing system 14 for providing vehicle navigational information for the purposes described herein. Vehicle navigation system 23 may also perform (or assist in performing) any desired route planning for the vehicle, for example, using vehicle occupant destination inputs in a known manner. Computing system 14 may incorporate a suitable navigational system interface (not shown in FIG. 2) if needed to facilitate operative communication with vehicle navigation system 23.

Vehicle navigation system 23 may include or be in operative communication with any sensor or sensors configured to estimate a geographic location of the vehicle 11. The vehicle navigation system 23 may also be configured to determine or plan a driving route from a given start point (for example, a current location of the vehicle 11 or another designated start location) to a selected destination, using stored and/or available maps, in a manner known in the art. To these ends, the vehicle navigation system 23 may include a one or more transceivers, including a transceiver operable to provide information regarding the position and/or movement of the vehicle 11 with respect to Earth. Vehicle navigation system 23 may store data such as roadway maps and path information, among other information. Such information may be used by the computing system 14 (either alone or in conjunction with vehicle navigation system 23) in calculating and evaluating various routes that may be autonomously driven by the vehicle 11.

Referring again to FIG. 1, vehicle 11 may include an array 28 of vehicle sensors designed to monitor various vehicle operational status parameters and environmental conditions external to the vehicle. In a known manner, the vehicle sensors provide data used by the vehicle computing system 14 in formulating and executing suitable control commands in the vehicle systems 18, 20, 22, 26. For example, data from inertial sensors, wheel speed sensors, road condition sensors, and steering angle sensors may be processed in formulating and executing a command in steering system 18 to turn the vehicle. Examples (not shown) of sensors that may be incorporated into a semi-autonomous or fully autonomous vehicle sensor array include radar and lidar systems, laser scanners, vision/camera systems, GPS systems, various inertial sensors such as gyroscopes and accelerometers, vehicle wheel speed sensors, road condition sensors, suspension height sensors, steering angle sensors, steering torque sensors, brake pressure sensors, accelerator or pedal position sensor, and tire pressure sensors.

The sensor array 28 may include various types of sensors in communication with other vehicle components, for providing feedback on operations of the vehicle. For example, sensors 28 may detect and store data corresponding to the vehicle's location (e.g., GPS coordinates), speed and direction, rates of acceleration and/or braking, and specific instances of sudden acceleration, braking, and swerving. Sensors 28 also may detect and store data received from the vehicle's internal systems. Sensors 28 may detect and store information relating to external driving conditions, for example, external temperature, rain, snow, light levels, and sun position for driver visibility. For example, external cameras and proximity sensors, radar, lidar and other types of sensors may detect other nearby vehicles, traffic levels, road conditions, traffic obstructions, animals, cyclists, pedestrians, and other conditions that may factor into a driving event data analysis. Sensors 28 may detect and store data relating to the maintenance of the vehicle, such as the engine status, oil level, engine coolant temperature, odometer reading, the level of fuel in the fuel tank, engine revolutions per minute (RPMs), and/or tire pressure. Vehicle sensors 28 also may include cameras and/or proximity sensors capable of recording additional conditions inside or outside of the vehicle. Certain of vehicle sensors 28 also may determine and collect information regarding the driver's route.

The data collected by vehicle sensors 28 may be stored and/or analyzed within the vehicle and/or may be transmitted to one or more external devices. For example, the sensor data may be transmitted via telematics devices to one or more remote computing systems, such as a mobile device, or off-vehicle facility as previously described. Any data collected by vehicle sensors 28 may also be transmitted to any vehicle system or component requiring or utilizing the data for the purposes described herein. For example, the data collected by vehicle sensors 28 may be transmitted to computing system 14, or to one or more specialized system or component controllers (not shown).

The sensor system 28 may include a number of sensors configured to sense information about an external environment of the vehicle 11. For example, the sensor system 28 may include a navigation unit such as a Global Positioning System (GPS) and other sensors, for example, an inertial measurement unit (IMU) (not shown), a RADAR unit (not shown), a laser rangefinder/LIDAR unit (not shown), and one or more cameras (not shown) comprising devices configured to capture a plurality of images of the interior of the vehicle and/or an external environment of the vehicle 11 may be used to determine the route, lane position, and other vehicle position/location data. The camera(s) may be still cameras or video cameras. The IMU may incorporate any combination of sensors (e.g., accelerometers and gyroscopes) configured to sense position and orientation changes of the vehicle 11 based on inertial acceleration. For example, the IMU may sense such parameters as vehicle roll rate, yaw rate, pitch rate, longitudinal acceleration, lateral acceleration, and vertical acceleration. The navigation unit may be any sensor configured to estimate a geographic location of the vehicle 11. To this end, the navigation unit may include a one or more transceivers, including a transceiver operable to provide information regarding the position of the vehicle 11 with respect to Earth. The navigation unit may also be configured to determine or plan a driving route from a given start point (for example, a current location of the vehicle) to a selected destination, using stored and/or available maps, in a manner known in the art. The sensor system 28 may also include sensors configured to monitor internal systems, components, and/or conditions of the vehicle 11 (e.g., an $O_2$ monitor, a fuel gauge, an engine oil temperature). Other sensors are possible as well. One or more of the sensors included in the sensor system 28 may be configured to be actuated separately or collectively in order to modify a position, an orientation, or both, of the one or more sensors.

In a known manner, the vehicle sensors 28 may provide data usable by the computing system 14 in formulating and executing suitable control commands for the various vehicle systems. For example, data from inertial sensors, wheel speed sensors, road condition sensors, and steering angle sensors may be processed in formulating and executing a command in steering system 18 to turn the vehicle. Vehicle sensors 28 may include any sensors required to support any driver assistance capabilities incorporated into the vehicle 11. In arrangements in which the sensor system 28 includes a plurality of sensors, the sensors can work independently from each other. Alternatively, two or more of the sensors can work in combination with each other. Sensors of the sensor system 28 can be operatively connected to the computing system 14 and/or any other element of the vehicle 11.

Additional ones of sensors 28 may detect and store information relating to external driving conditions, for example, external temperature, rain, snow, light levels, and sun position for driver visibility. For example, external cameras and proximity sensors may detect other nearby vehicles, traffic levels, road conditions, traffic obstructions, animals, cyclists, pedestrians, and other conditions that may factor into a driving event data analysis. Additional ones of sensors 28 may detect and store data relating to the maintenance of the vehicle, such as the engine status, oil level, engine coolant temperature, odometer reading, the level of fuel in the fuel tank and/or the battery or electrical power level in a gas-hybrid vehicle, engine revolutions per minute (RPMs), and/or tire pressure.

Sensors 28 may include sensors configure to detect other vehicles, pedestrians, animals and other objects, either moving or stationary, which are within a certain distance of vehicle 11. The sensors may be configured to detect and/or estimate various characteristics of the vehicles and other objects. For example, sensors 28 may be configured to detect whether a vehicle or other object is moving or stationary with respect to the surroundings. Sensors 28 may be configured to detect/and or estimate a direction and speed of a moving vehicle or object with respect to the vehicle 11 and with respect to relatively static characteristics (for example, trees or traffic signs) of the surroundings. Sensors 28 may be configured to detect whether or not another vehicle has a turn signal activated.

Additional particular types of sensors may include any other types of sensors needed to perform the functions and operations described herein. In general, the sensors may be configured to detect and/or estimate (and/or to acquire data which may be used by computing system 14 to estimate or determine values of any of the parameters and conditions which may be used in determining whether the vehicle 11 is in one of the user-selected predefined driving situations, and which may be usable in formulating or selecting vehicle control commands suitable for responding to a predefined driving situation in accordance with an associated selected vehicle response mode.

If a controller or computing system 14 may require processing of an integrated or composite signal formed from outputs of multiple individual sensors, the vehicle 11 may incorporate a known sensor fusion means 138 (incorporating, for example, a suitable Kalman filter and/or another element incorporating or embodying a suitable sensor fusion algorithm) in communication with other pertinent vehicle systems, such as computing system 14, sensor system 28, and other vehicle systems. The sensor fusion means 138 may process data received from the various vehicle sensors to generate an integrated or composite signal (formed, for example, from outputs of multiple individual sensors). The sensor fusion means 138 may further provide various assessments based on data from the sensor system 28. In an example embodiment, the assessments may include evaluations of individual objects or features in the environment of the vehicle 11, evaluation of a particular situation, and evaluation of possible impacts based on the particular situation. Other assessments are also possible. The sensor fusion means 138 may be stored on a memory (such as memory 54) incorporated into or in operative communication with computing system 14, and may be operated by the computing system in a manner known in the art.

Also, if a sensor output signal requires pre-processing prior to use by a controller or computing system 14, a known pre-processing means (not shown) (for example, an A/D converter) may be in communication with other pertinent vehicle systems, such as computing system 14, sensor system 28, and other vehicle systems. Similarly, if operation of any actuatable sub-system components or other vehicle components (for example, components of the steering system or throttle system) will require processing of a control signal received from a controller, a known post processing means (for example, an D/A converter) may be provided in communication with other pertinent vehicle systems, such as computing system 14, sensor system 28, and other vehicle systems.

The vehicle 11 may be configured so that the various controllers, sensors and other elements of the system can communicate with each other using a controller area network (CAN) bus 33 (FIG. 1) or the like. Via the CAN bus and/or other wired or wireless mechanisms, the computing system 14 may transmit messages to various devices in the vehicle and/or receive messages from the various devices, e.g., controllers, actuators, sensors, etc. Alternatively, any of the elements and/or systems described herein may be directly connected to each other without the use of a bus. Also, connections between the elements and/or systems described herein may be through another physical medium (such as wired connections), or the connections may be wireless connections.

Figure 3:
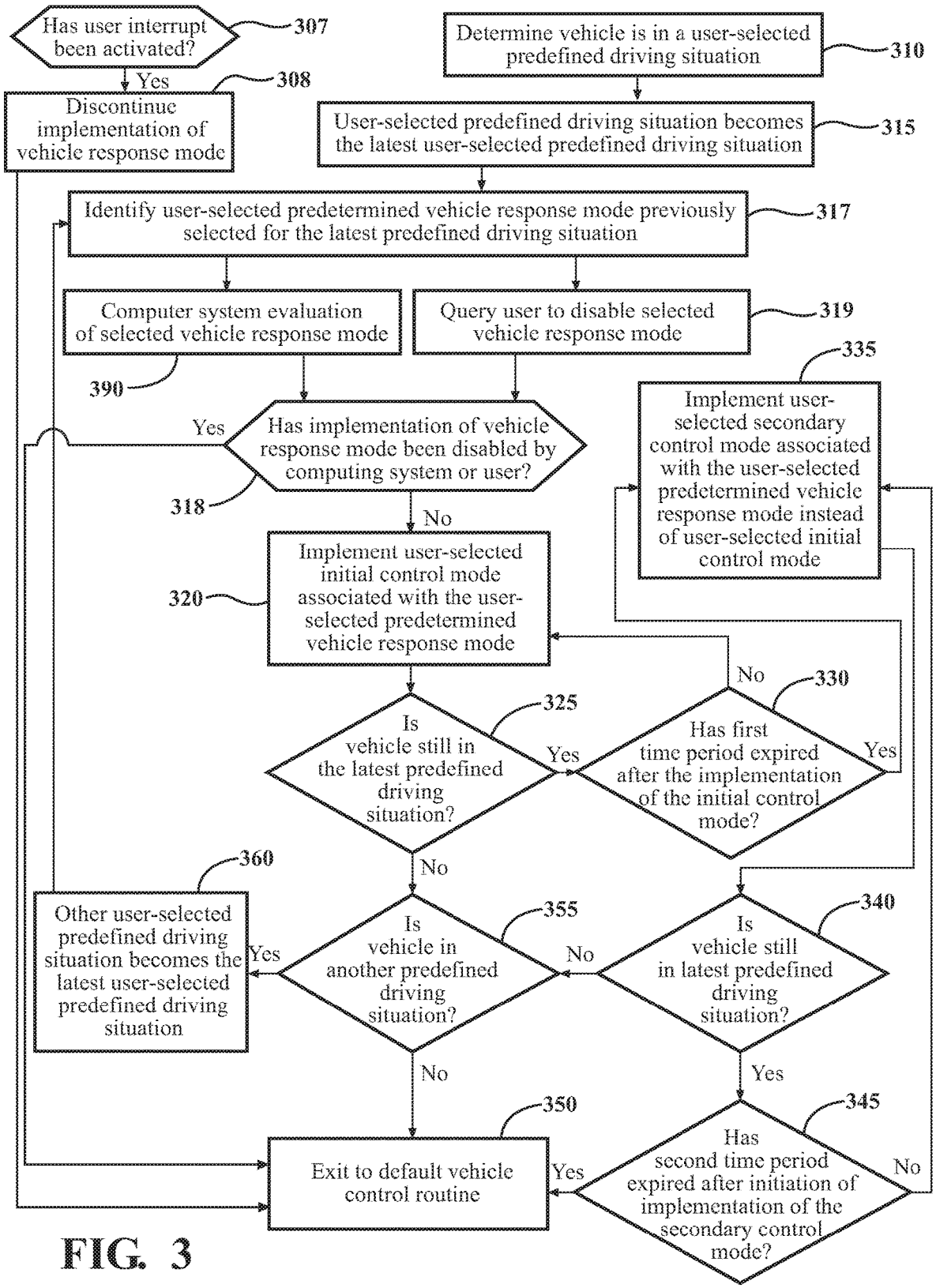
FIG. 3 is a flow diagram showing operation of a computing system in accordance with an embodiment described herein, for purposes of indicating to a person exterior of the vehicle a user-selected response to a user-selected predefined driving situation.

FIG. 3 is a flow diagram showing operation of an embodiment of a computing system (such as onboard computing system 14 or an off-vehicle computing system, for example) for purposes of indicating to a person exterior of the vehicle a user-selected response to a user-selected predefined driving situation.

In block 310, the computing system may determine, based on an assessment of the sensor data and/or other pertinent parameters, that vehicle 11 is currently in a user-selected predefined driving situation.

In block 315, the user-selected predefined driving situation detected in block 310 becomes the latest user-selected predefined driving situation for purposes of determining a user-selected predetermined vehicle response mode.

In block 317, the computing system may identify a user-selected predetermined vehicle response mode previously selected for the latest predefined driving situation.

In block 318, the computing system may evaluate the user-selected vehicle response mode for safety and other considerations, as previously described. If the computing system determines that the selected vehicle response mode should not be implemented, the computing system may communicate with a user via HMI 109 to inform the user that the previously selected vehicle response mode should not be implemented in the current or pending predefined driving situation. In addition, in block 319, the computing system may query the user to determine if the user wishes to disable implementation of the previously selected vehicle response mode in the current or pending predefined driving situation. Blocks 318 and 319 may be executed simultaneously.

In block 390, the computing system may determine if implementation of the previously selected vehicle response mode has been disabled, either by the computing system 14 or by a user. If the previously selected vehicle response mode has been disabled, vehicle control may transfer (in block 350) to the default vehicle control routine as previously described. However, if the previously selected vehicle response mode has not been disabled, the computing system may implement (in block 320) a user-selected initial control mode associated with the user-selected predetermined vehicle response mode for the latest predefined driving situation. To implement a user-selected initial control mode, the computing system may generate and implement vehicle control commands designed to generate the user-selected initial indicators (for example, flashing headlights or operation of the vehicle horn) associated with the initial control mode.

In block 325, the computing system may determine if the vehicle 11 is still in the latest user-selected predefined driving situation. The vehicle sensor data and other driving situation parameters may be monitored by the computing system on a continuous basis to detect a change in the driving situation as soon as it occurs.

Changes in sensor data or parameters which may indicate a change in the driving situation may be monitored using sensors 28, and the computing system may be configured to interpret the information acquired to detect changes in the driving situation. The computing system may be configured to register a change in the driving situation responsive to an action by the other vehicle or person exterior of the vehicle 11. For example, in a situation where the vehicle 11 and another vehicle are both stopped at an intersection, the computing system may determine that the driving situation has changed when the other vehicle starts to proceed through the intersection after initiation of implementation of an initial vehicle response mode. In another example, in a situation such as that shown in FIGS. 5A-5D where a pedestrian is in the road ahead of the vehicle 11, the computing system may determine that the driving situation has changed when the pedestrian starts to proceed across the road after initiation of implementation of the initial control mode. Such changes in the driving situation may be interpreted by the computing system 14 as signs that the other person has perceived the initial indicators and has acknowledged the indicators by behaving in a manner desired and anticipated by the user. Similarly, if no movement of the other vehicle or pedestrian is detected after initiation of implementation of the initial control mode, the computing system may determine that the other person has not perceived the initial indicators or, for some other reason, is not responding to the indicators in the manner intended by the user of vehicle 11.

In block 330, if the vehicle 11 is still in the latest user-selected predefined driving situation, the computing system may determine if a first predetermined time period has expired after initiation of implementation of the initial control mode. If the vehicle 11 is still in the latest user-selected predefined driving situation and the first predetermined time period has not expired after initiation of implementation of the initial control mode, the computing system may continue with implementation of the initial control mode as described in block 320.

In block 335, if the vehicle 11 is still in the latest user-selected predefined driving situation and the computing system determines that the first predetermined time period has expired, the predefined driving situation has not changed during the time period after initiation of implementation of the initial control mode. Then, in block 335, if the vehicle 11 is still in the latest user-selected predefined driving situation and the computing system determines that the first predetermined time period has expired, the computing system may implement a user-selected secondary control mode associated with the user-selected predetermined vehicle response mode for the latest predefined driving situation, instead of implementing the user-selected initial control mode.

In one or more arrangements, the user-selected secondary control mode may specify the same indicators and at the same intensity levels as specified by the user-selected initial control mode. Thus, the user-selected secondary control mode may be implemented by continuing generation of the indicators and at the same intensity levels found in the user-selected initial control mode.

In one or more arrangements, the user-selected secondary control mode may specify one or more of the same indicators as the user-selected initial control mode, at different intensity levels than those specified in the initial control mode. Thus, the user-selected secondary control mode may be implemented by continuing generation of one or more of the indicators found in the user-selected initial control mode, but also by varying the intensity level of one or more indicators. For example, where flashing of vehicle headlights 73 intermittently on and off at a first, relatively slower rate is specified as an initial indicator, flashing of the vehicle headlights 73 intermittently on and off at a second, relatively faster rate may be specified as an secondary indicator, as a further attempt to attract the attention of the person exterior of the vehicle, and to emphasize the user's intended response to the predefined driving situation.

In one or more arrangements, the user-selected secondary control mode may specify the some (or none) of the same indicators as the user-selected initial control mode, and also one or more additional or different indicators. Thus, the user-selected secondary control mode may be implemented by continuing generation of one or more initial indicators specified in the user-selected initial control mode, and also by generating the additional or different indicators. For example, where flashing of vehicle headlights intermittently on and off is specified as an initial indicator, both flashing of the vehicle headlights intermittently on and off and operation of the vehicle horn to produce a sound may be specified as secondary indicators, as a further attempt to attract the attention of the person exterior of the vehicle, and to emphasize the user's intended response to the predefined driving situation.

In block 340, the computing system may is determine if the vehicle 11 is still in the latest user-selected predefined driving situation. If the vehicle 11 is still in the latest user-selected predefined driving situation, the computing system may (in block 345) determine if a second predetermined time period has expired after initiation of implementation of the secondary control mode. If the vehicle 11 is still in the latest user-selected predefined driving situation and the second predetermined time period has not expired after initiation of implementation of the secondary control mode, the computing system may continue with implementation of the secondary control mode as described in block 335.

However, if the vehicle 11 is still in the latest user-selected predefined driving situation and the second predetermined time period has expired after initiation of implementation of the secondary control mode, the computing system may determine that the person exterior of the vehicle still has not perceived the initial and/or secondary indicators or, for some other reason, does not plan to respond to the indicators in the desired manner. In this case, the computing system may (in block 350) discontinue implementation of the conditional secondary control mode (i.e., halt generation of the secondary indicators) and transfer vehicle control to a default vehicle control routine.

Returning to block 325, if the vehicle 11 is not still in the latest user-selected predefined driving situation, the computing system may determine (in block 355) if the vehicle 11 is currently in another user-selected predefined driving situation. The other user-selected predefined driving situation may be a situation of the same type, or the other situation may be a situation of a different type.

The computing system may be configured to, if the vehicle 11 is in another user-selected predefined driving situation, implement a user-selected predetermined vehicle response mode associated with the other user-selected predefined driving situation. The predetermined vehicle response mode associated with the other user-selected predefined driving situation may include an initial control mode specifying one or more user-selected initial indicators of the user-selected predetermined vehicle response mode associated with the other user-selected predefined driving situation. The predetermined vehicle response mode associated with the other user-selected predefined driving situation may also include a conditional secondary control mode specifying one or more user-selected secondary indicators of the user-selected predetermined vehicle response mode associated with the other user-selected predefined driving situation. The one or more initial indicators and the one or more secondary indicators of the user-selected predetermined vehicle response mode associated with the other user-selected predefined driving situation may be configured to be perceivable by a person exterior of the vehicle.

If the vehicle 11 is currently in another user-selected predefined driving situation, the computing system may (in block 360) may set the other user-specified predefined driving situation as the new latest user-specified predefined driving situation, for purposes of responding to the driving situation in accordance with an associated user-selected predetermined response mode. Control may then proceed to block 317, where a user-selected vehicle response mode for the latest (other) predefined driving situation is determined. However, if it is determined that the vehicle 11 is not in another user-selected predefined driving situation, control may discontinue implementation of the initial control mode (i.e., halt generation of the initial indicators) and transfer (in block 350) to the default vehicle control routine as previously described.

In parallel with the steps 310-390 just described, the computing system 14 may be configured to monitor for user selection of the vehicle response mode user interrupt function previously described. That is, simultaneously with initiation of implementation of the vehicle response mode in block 320, the computing system may (in block 307) display for user selection an interactive prompt enabling selection of the user interrupt. During execution of the other blocks shown in FIG. 3, the computing system may continuously monitor for user selection of the interrupt. As soon as the interrupt is selected (if it is selected), the computing system may immediately (in block 308) discontinue implementation of the vehicle response mode and transfer vehicle control (in block 350) to the default vehicle control routine.

FIGS. 4A-4D are schematic views of example embodiments of HMI interactive user interface screens (such as touch screens) operable to enable user selection of predefined driving situations and predetermined vehicle response mode initial and secondary indicators, in accordance with embodiments described herein. HMI 109 may be configured to operate in conjunction with (or as a part of) computing system 14, to enable a user of vehicle 11 to specify predefined driving situations to which the vehicle will respond.

In FIG. 4A, a user may select a predefined driving situation for autonomous response. The selectable predefined driving situations available in FIG. 4A include a situation 401 where another vehicle is changing lanes from another lane to lane in which the vehicle 11 is driving, and to a position in front of the vehicle 11; a situation 403 where the vehicle 11 and one or more other vehicles are stopped at an intersection at the same time; and a situation 405 where a pedestrian is standing in the road ahead of the vehicle 11 but not directly in the path of the vehicle 11. As an example, a user may select a situation 403 where the vehicle 11 and one or more other vehicles are stopped at an intersection at the same time.

Responsive to selection of the situation 403, the computing system 14 and HMI 109 may display the screen shown in FIG. 4B, enabling the user to select a desired vehicle response mode. The user-selectable vehicle response modes listed in FIG. 4B may be particular to a given predefined driving situation, as selected from the screen shown in FIG. 4A. For example, the selectable response modes shown in FIG. 4B may be expressions of the intent of the user in responding to the particular selected predefined driving situation selected in FIG. 4A.

A user may be given an option 410 of enabling the computing system 14 to autonomously select the vehicle response mode in a manner described herein and responsive to a determination that the vehicle is in the selected predefined driving situation. If this option is selected, the computing system may control the HMI 109 to exit the menu because selection of the vehicle response mode and associated initial and secondary indicators may be made by the computing system responsive to the predefined driving situation. Otherwise, the user may manually select one of the vehicle response mode options presented and may continue on subsequent screens to select associated initial and secondary indicators to be generated responsive to the predefined driving situation.

User-selectable vehicle response mode options may include allowing a vehicle positioned on the right of the vehicle 11 to proceed through the intersection before the vehicle 11 (option 411); allowing a vehicle positioned on the left of the vehicle 11 to proceed through the intersection before the vehicle 11 (option 413); allowing all other vehicles stopped at the intersection to proceed before the vehicle 11 (option 415); and allowing a left turning facing the vehicle 11 in an opposite lane to make the left turn before the vehicle 11 proceeds through the intersection (option 417). User-actuatable reset functions on each screen shown in FIGS. 4A-4D may permit the user to reset or "zero out" the parameter controlled by the screen. This enables a user to change the parameter selection. For example, an initial response mode indicator in FIG. 4C may be changed from "flash headlights (slower)" to "operate horn" by actuating the reset function to cancel "flash headlights (slower)" and then selecting "operate horn".

In one example, the user may select the option 411 of allowing a vehicle to the right of the vehicle 11 in the intersection to proceed first. Responsive to selection of the option 411, the computing system 14 and HMI 109 may display the screen shown in FIG. 4C. This enables the user to select initial control mode indicators associated with the user-selected predetermined vehicle response mode selected from the screen shown in FIG. 4B. The user may select one or more initial indicators for generation by the vehicle. If multiple initial indicators are selected and a certain indicator conflicts with another indicator, a message to this effect may be displayed on the HMI screen. In the example shown, a user may select from initial indicators including flashing of the vehicle headlights at a first, relatively slower rate (421); flashing of the vehicle high beams at a first, relatively slower rate (423); and operation of the vehicle horn (425). Other initial indicators may also be provided for selection if desired. In one example, the user may select option 421 for intermittent flashing of the vehicle headlights at a relatively slower rate as an initial indicator. The user may also select a predetermined time period 427 during which the initial indicators will be generated. In one or more arrangements, a user may specify a predetermined time period within the range of 3-5 seconds. The computing system may be configured to implement a predetermined time period of a default length (for example 3 second) if the user does not specify a time period length.

When the user has finished selecting initial indicators, the user may touch "done". Then, the computing system 14 and HMI 109 may display the screen shown in FIG. 4D, enabling user selection of secondary control mode indicators. If the user does not wish to specify secondary indicators, the user may press or activate "DONE". In the example shown, a user may select from secondary indicators including flashing of the vehicle headlights at a second, relatively faster rate (431); flashing of the vehicle high beams at a second, relatively faster rate (433); and operation of the vehicle horn (435). Other secondary indicators may also be provided for selection if desired. In one example, the user may select intermittent flashing of the headlights at a faster rate (431) and operation of the vehicle horn (435) as secondary indicators. The user may touch "DONE" on the screen of FIG. 4D. The computing system is now configured to implement the initial and secondary indicators when the vehicle 11 is determined to be in a situation where both the vehicle 11 and one or more other vehicles stopped at an intersection at the same time. Responsive to the user's selection of predefined driving situation 403 (where the vehicle 11 and one or more other vehicles are stopped at an intersection at the same time) and response mode 411 (allowing a vehicle to the right of the vehicle 11 in the intersection to proceed first), if the sensors and computing system of vehicle 11 detect that one or more other vehicles are stopped at an intersection at the same time as vehicle 11 and that one of the other vehicles is stopped in the cross street intersection to the right of the vehicle 11, the user-selected vehicle response mode will be triggered, and the indicators relating to the selected response mode 411 and selected by the user from the menu screens shown in FIGS. 4C and 4D, will be generated. Thus, the selected vehicle response mode is only activated when the selected predefined driving situation is detected.

Figure 5A:
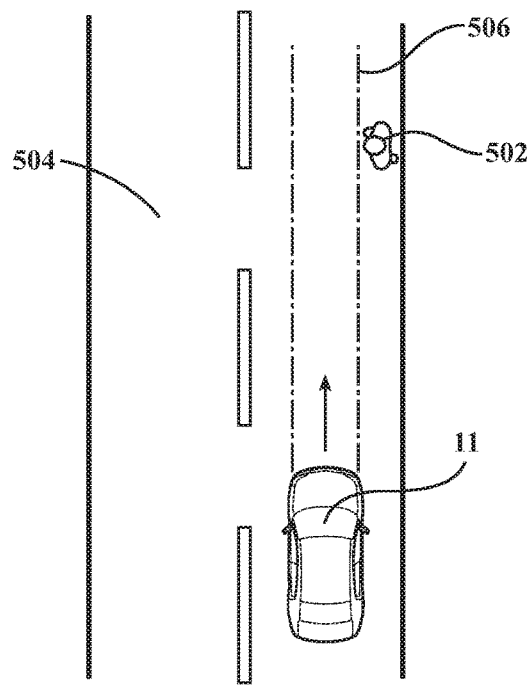
FIG. 5A is a plan schematic view showing a first example of a predefined driving situation to which a vehicle 11 may be configured to respond.
Figure 5B:
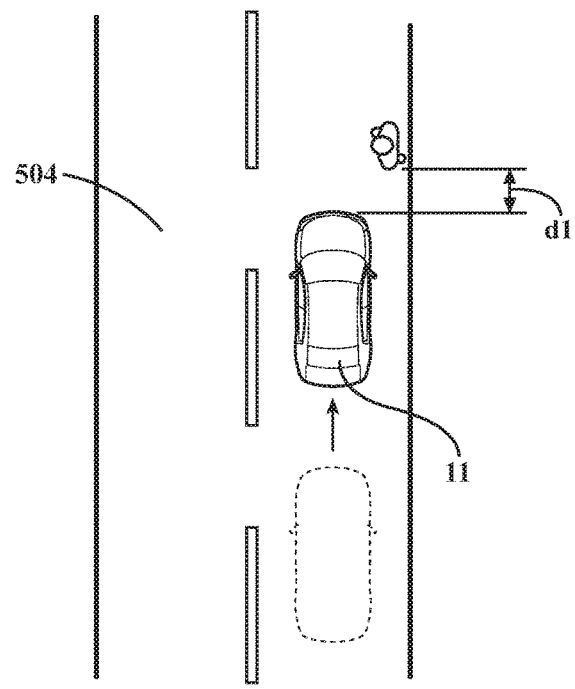
FIG. 5B is the view of FIG. 5A showing a vehicle 11 stopped for a pedestrian as an initial indicator of an intended vehicle response mode in responding to the predefined driving situation of FIG. 5A.
Figure 5C:
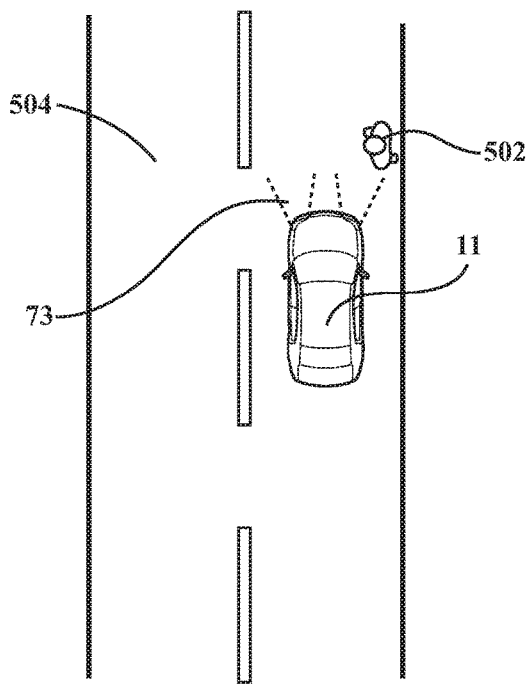
FIG. 5C is the view of FIG. 5A showing the vehicle 11 stopped for a pedestrian and intermittently flashing headlights as secondary indicators of an intended vehicle response mode in responding to the predefined driving situation of FIG. 5A.
Figure 5D:
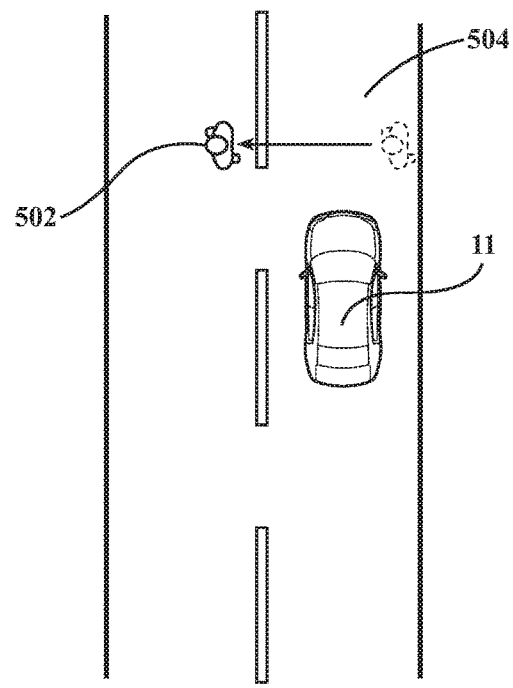
FIG. 5D is the view of FIG. 5A showing the pedestrian responding to the secondary indicators of FIG. 5C.

FIGS. 5A-5D show an example of operation of a computing system configured in a manner similar to that just described to autonomously control the vehicle 11 upon detection of a pedestrian 502 standing in the road 504 ahead of the vehicle 11 but not directly in the path 506 of the vehicle. In FIG. 5A, the vehicle sensors 28 may be configured to detect the pedestrian 502 in the road 504 and other aspects of the driving situation for the determination that the vehicle 11 is in the predefined driving situation. As initial indicators of the user's intended response, the computing system may be configured to slow the vehicle 11 in time to stop at a predetermined distance dl from the pedestrian 502 and to remain stopped at this location. In FIG. 5B, the vehicle 11 has stopped a predetermined distance dl from the pedestrian. In one or more arrangements, the computing system 14 and HMI 109 may be configured to enable a user to specify the distance dl. In one or more arrangements, the computing system may assign a default value to distance dl if the user does not specify a value. In one or more particular arrangements, the default value may be 30 meters, for example, or any other suitable value. The pedestrian 502 may perceive the stopping of vehicle 11 as an indication that the vehicle will remain stopped so that the pedestrian 502 can cross the street. If the pedestrian 502 does not cross the street (for example, due to uncertainty or distraction of the pedestrian 502), the computing system may autonomously generate a user-selected secondary indicator comprising intermittently flashing headlights 73 at the pedestrian 502 to indicate that the vehicle 11 is waiting for the pedestrian 502 to cross the road 504 before the vehicle 11 proceeds (FIG. 5C). The pedestrian 502 may then cross the street (FIG. 5D). As previously described, a computing system (such as computing system 14, for example) may be configured to generate the various indicators described herein by user selection of the indicators and subsequent computer system generation or selection of vehicle control commands designed to generate the indicators.

FIGS. 6A-6D show an example of operation of a computing system configured in a manner similar to that just described to autonomously control the vehicle 11 upon detection of another vehicle 602 attempting to move from an adjacent lane 604 into a lane 606 in which the vehicle 11 is traveling, and ahead of the vehicle 11. The vehicle sensors 28 may be configured to detect the identifying aspects of the driving situation to enable a determination that the other vehicle 602 is attempting to change lanes. For example, sensors 28 may detect operation of a turn signal on the vehicle 602 indicating a desired to change lanes. Alternatively, the sensors and computing system may determine that the other vehicle 602 is attempting to change lanes from a motion of the vehicle 602 toward the lane 606 while traveling ahead of the vehicle 11.

The computing system 14 may be configured to implement a response mode designed to convey to a driver of the vehicle 602 that the user of vehicle 11 wishes to provide sufficient space to the other vehicle 602 to allow a safe lane change. To convey this intent to the driver of vehicle 602, the computing system 14 may be configured to, as an initial indicator of user intent, slow down upon determination of an attempted lane change by vehicle 602. This may increase the following distance between the vehicle 11 and the vehicle 608 that the vehicle 11 is following, as shown in FIG. 6B. After the vehicle 11 has slowed to increase the following distance, the vehicle 11 may be controlled to intermittently blink the headlights 73 on and off at a first rate as an initial indicator.

If, after passage of a first predetermined time period following initiation of implementation of the initial control mode (i.e., blinking headlights at the first rate), the other vehicle 602 fails to change lanes to lane 606, the computing system 14 may determine that the vehicle 11 is in the same predefined driving situation. This may prompt initiation of implementation of the secondary control mode. In FIG. 6C, for this mode, the computing system 14 may be configured to control the vehicle 11 to intermittently blink the headlights 73 on and off at a second rate greater than the first rate, as a secondary indicator. The computing system 14 may also be configured to control the vehicle 11 to operate the horn 75 as a secondary indicator. This implementation of the secondary control mode may continue for a second predetermined time period, or until the computing system determines that the vehicle 11 is no longer in the same predefined driving situation (for example, because the vehicle 602 has changed lanes, as seen in FIG. 6D). When the computing system 14 detects that the second predetermined time period has ended or the vehicle 11 is no longer in the same predefined driving situation (for example, because the other vehicle 602 is no longer in the adjacent lane and determined to be attempting to change lanes), implementation of the conditional secondary control mode may be discontinued and vehicle control may be transferred to a default vehicle control routine as previously described.

Figure 7B:
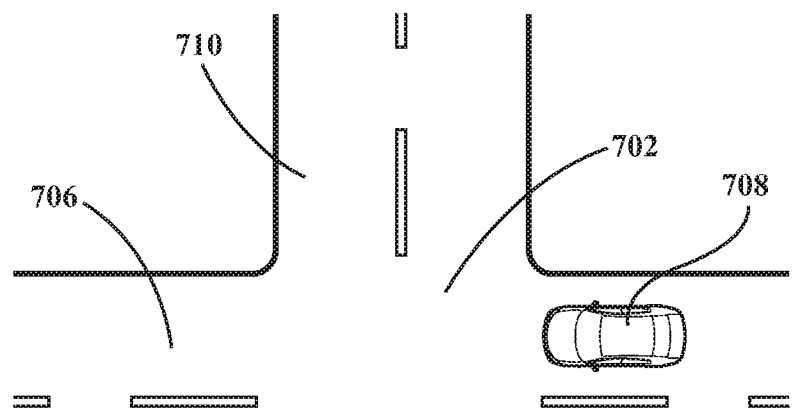
FIG. 7B is the view of FIG. 7A showing the vehicle 11 intermittently flashing headlights as an initial indicator of an intended vehicle response mode in responding to the predefined driving situation of FIG. 7A.
Figure 7C:
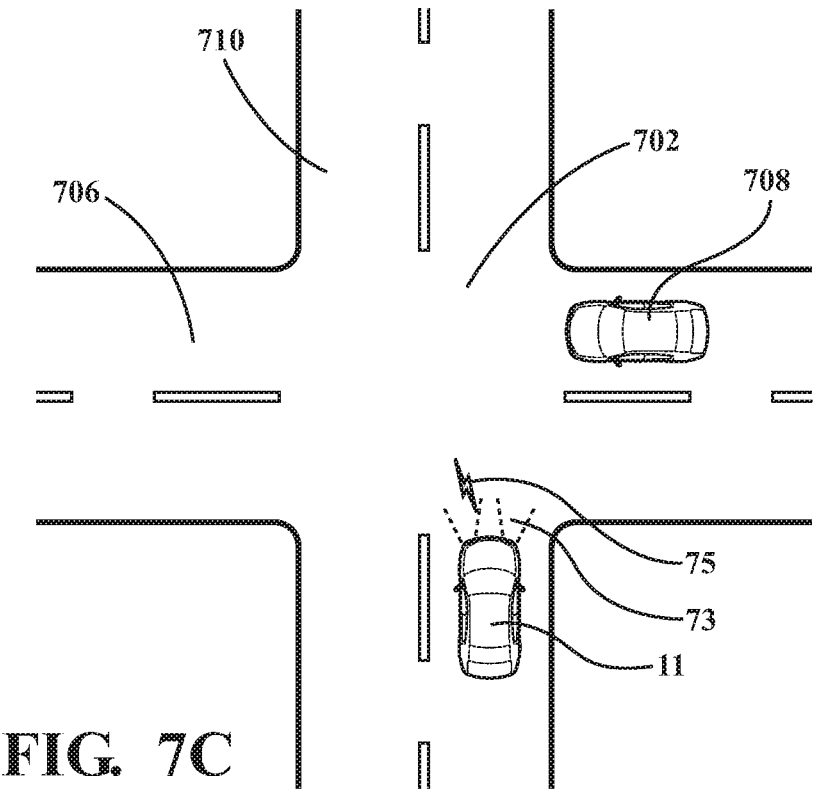
FIG. 7C is the view of FIG. 7A showing the vehicle 11 intermittently flashing headlights and operating the vehicle horn as secondary indicators of an intended vehicle response mode in responding to the predefined driving situation of FIG. 7A.
Figure 7D:
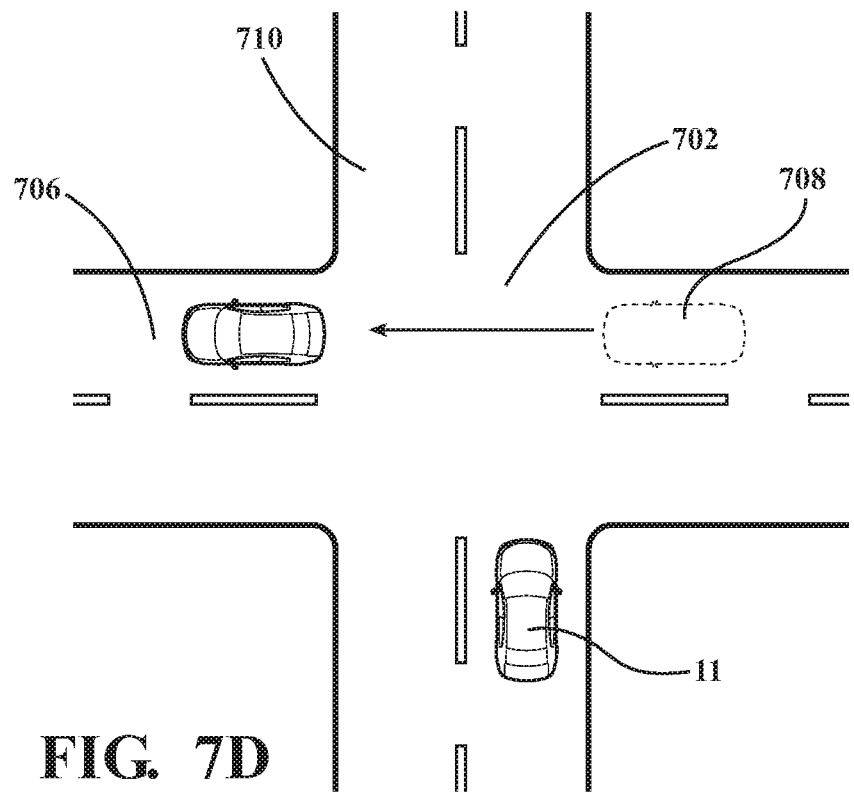
FIG. 7D is the view of FIG. 7A showing the vehicle 708 responding to the secondary indicators of FIG. 7C.

FIGS. 7A-7D show an example of operation of a computing system configured in a manner similar to that just described to autonomously control the vehicle 11 upon a determination that the vehicle 11 and one or more other vehicles are stopped at an intersection 702, as shown in FIG. 7A. Vehicle sensors 28 may be configured to detect the presence of the vehicle 11 in an intersection 702, also the presence of one or more other vehicles (such as vehicle 704) stopped in cross street 706 or in an opposite lane 710 of the intersection 702, and other aspects of driving situations relating to vehicles stopped at an intersection. The computing system 14 may be configured to implement a vehicle response mode in which the vehicle 11 conveys to a stopped vehicle 708 on the right of the vehicle 11 an intent of the user to let the vehicle 708 proceed through the 702 intersection before vehicle 11. In FIG. 7A, vehicle 11 detects the other vehicle 708 in the intersection on its right. In FIG. 7B, the computing system controls the vehicle 11 to implement the vehicle response mode by implementing an initial control mode. On one example, an initial control mode may be configured by the user to specify intermittently blinking of the headlights 730 on and off at a first rate as an initial indicator. If, after passage of a first predetermined time period following initiation of implementation of the initial control mode, the other vehicle 708 fails to proceed through the intersection 702, the computing system 14 may determine that the vehicle 11 is in the same predefined driving situation. This may prompt initiation of implementation of the secondary control mode In FIG. 7C. For this mode, the computing system 14 may be configured to control the vehicle 11 to both intermittently blink the headlights 73 on and off at a second rate greater than the first rate and operate the horn 75, as secondary indicators. This implementation of the secondary control mode may continue for a second predetermined time period, or until the computing system determines that the vehicle 11 is no longer in the same predefined driving situation (for example, because the vehicle 708 has started to move into the intersection, as seen in FIG. 7D). When the computing system 14 detects that the second predetermined time period has ended or the vehicle 11 is no longer in the same predefined driving situation, implementation of the conditional secondary control mode may be discontinued and vehicle control may be transferred to a default vehicle control routine as previously described.

Although the various aspects of the systems and methods of the present invention have been described using examples of various particular predefined driving situations, it will be understood that the principles set forth herein may be adapted and applied to other predefined driving situations as desired.

In one or more arrangements, vehicle 11 may be configured for both manual and at least semi-autonomous operation. The vehicle computing system 14 may be configurable by a user as described herein to autonomously respond to a user-selected predefined driving situation, to the extent that the vehicle systems and elements may be controllable by the computing system to autonomously generate one or more primary and/or secondary indicators selectable by a user. For example, the vehicle 11 may be configured such that the vehicle headlights, high beams, and horn may be autonomously controlled by the computing system 14 responsive to a user-selected predetermined vehicle response mode, while other vehicle systems or elements otherwise usable for response mode indicators may not be autonomously controllable by the computing system. In such cases, the user may pre-select a vehicle response mode including an initial control mode and (optionally) a secondary control mode including the vehicle headlights, high beams, horn any other available autonomously generatable indicators.

In one or more arrangements, the computing system 14 may be configured to generate a warning to a driver or other user of the vehicle 11 indicating that the vehicle 11 appears to be entering (or has entered) a user-selected predefined driving situation. The user may also be provided with an option of disabling a previously selected predetermined vehicle response mode, so that the driver may maintain control of the vehicle, or so that the vehicle 11 may respond autonomously to the driving situation using a default vehicle control routine.

In one or more arrangements, the computing system and HMI 109 may be configured to enable a user to select operation of only an initial control mode. Then, after expiration of the predetermined time period after initiation of implementation of the initial control mode, control of the vehicle may transfer to the default vehicle control routine without implementing a secondary control mode.

In another operational mode, a user may select predefined driving situation(s) to which the vehicle will automatically respond when the vehicle encounters the driving situation(s). Then, when the vehicle encounters one of the predefined driving situations, a computing system (such as vehicle computing system 14 or another computing system) may (using the vehicle response mode selection capability 207) determine a vehicle response mode to be used for responding to that particular predefined driving situation at that particular time. The computing system may also select the initial indicators that will be generated by the computing system for use in implementing the computer-selected vehicle response mode. The computing system may also select the secondary indicators that will be generated by the computing system for use in implementing the computer-selected vehicle response mode. In this operational mode, one or more of the initial and/or secondary indicators (such as headlights) selected by the computing system may be implemented by operation of the computing system on various portions of the vehicle, as previously described. In addition, one or more of the initial and/or secondary indicators selected by the computing system may be implemented by a human driver who is driving the vehicle 11 in a semi-autonomous or manual driving mode. These indicators may be implemented by the driver responsive to prompting of the driver by the computing system. The prompting may be in the nature of haptic feedback as previously described. That is, the computing system may control operation of the vehicle to generate haptic feedback to a human driver of the vehicle, the haptic feedback being configured to prompt the driver to operate at least one portion of the vehicle to generate one or more of the initial indicators and/or one or more of the secondary indicators of the vehicle response mode.

In one or more arrangements, the vehicle artificial intelligence (AI) and/or machine learning capabilities 17 may be configured to aid in computer selection of the vehicle response mode, initial indicators, and secondary indicators that will be implemented in responding to a given driving situation. Vehicle operational parameters (such as brake condition) and environmental conditions (such as ice, fog, and road conditions) may affect the choice of initial and/or secondary indicators by the computing system, and may also affect whether or not a vehicle response mode will be implemented by the computing system in response to the driving situation. For example, in a driving situation as shown in FIGS. 7A-7D in which vehicles are stopped at an intersection, the selection of an initial indicator by the computing system 14 may be influenced by the level of ambient light detected by the vehicle sensors 28. If the ambient light level at the intersection is especially high, the computing system 14 may determine that flashing of headlights of the vehicle 11 may not be visible to a driver in the vehicle 708. In this case, due to the high ambient light level, the computing system may select flashing of vehicle 11 high beam lights rather than flashing of regular headlights as an initial indicator. The computing system could also (or alternatively) select operation of the vehicle horn as an initial indicator, to help ensure that the attention of the driver of vehicle 708 would be drawn to the vehicle 11 as soon as possible.

In another example, because the vehicle-selected vehicle response modes may be responses which are discretionary based on an intention (but not a necessity) to respond to a given driving situation in specified manner, the computing system may elect to forego selection of a vehicle response mode if conditions are such that implementation of the mode may increase the risk to the vehicle 11 and/or to other vehicles. For example, if the vehicle is in situation (such as icy or low visibility conditions) where it may be inadvisable to slow or stop unnecessarily, the computing system 14 may elect not to respond to a detected predefined driving situation by selecting and implementing an associated vehicle response mode directed specifically to the driving situation.

Figure 8A:
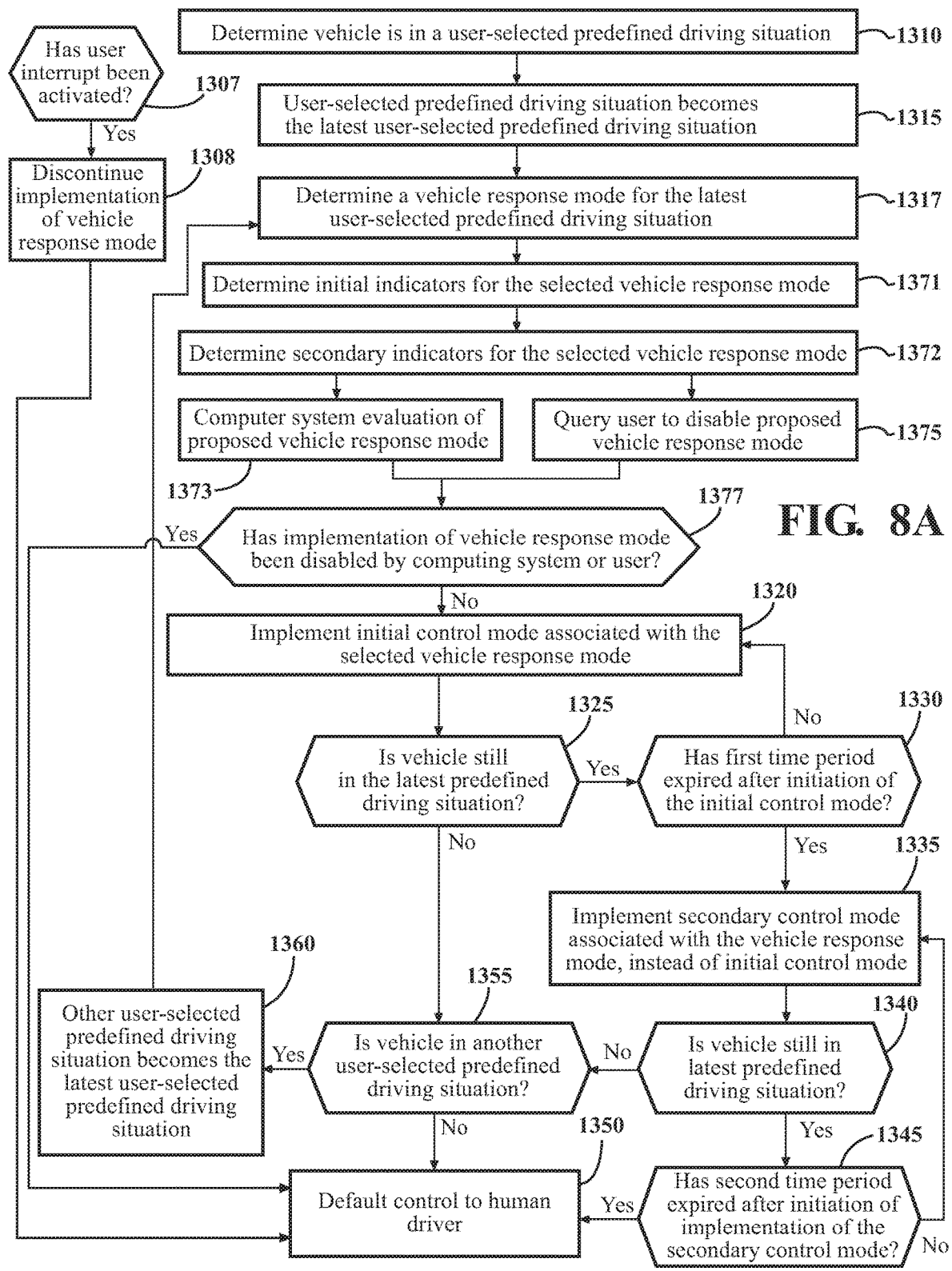
FIG. 8A is a flow diagram showing operation of an embodiment of a computing system for purposes of selecting a vehicle response mode and initial and secondary indicators to be used to implement the computer-selected vehicle response mode after detection of a user-selected predefined driving situation.
Figure 8B:
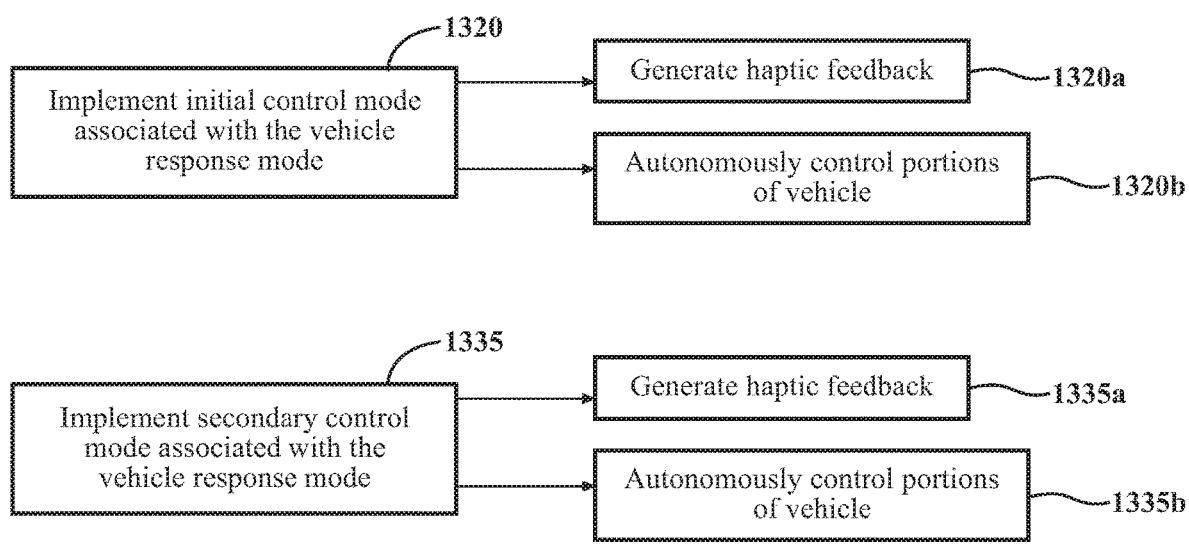
FIG. 8B is a flow diagram illustrating implementation of the initial control mode in block 1320 and implementation of the secondary control mode in block 1335 shown in FIG. 8A.

FIGS. 8A and 8B are flow diagrams showing operation of an embodiment of a computing system (such as onboard computing system 14 or an off-vehicle computing system, for example) for purposes of selecting a vehicle response mode and initial and secondary indicators to be used to implement the selected vehicle response mode after detection of a user-selected predefined driving situation. FIGS. 8A and 8B also show operation of the computing system to indicate to a person exterior of the vehicle the selected response mode to the user-selected predefined driving situation.

In block 1310, the computing system may determine, based on an assessment of the sensor data and/or other pertinent parameters, that vehicle 11 is currently in a user-selected predefined driving situation.

In block 1315, the user-selected predefined driving situation detected in block 1310 becomes the latest user-selected predefined driving situation for purposes of the computing system determining or selecting a vehicle response mode.

In block 1317, the computing system may select a vehicle response mode for the latest predefined driving situation, in accordance with selection criteria previously described (or other criteria). The computing system may also alert a vehicle user or occupant of the computer-selected vehicle response mode.

In block 1371, the computing system may determine initial indicators for the selected vehicle response mode, in accordance with selection criteria previously described (or other criteria).

In block 1372, the computing system may determine secondary indicators for the selected vehicle response mode, in accordance with selection criteria previously described (or other criteria).

In block 1373, the computing system may evaluate the user-selected vehicle response mode (including the selected initial and secondary indicators) for safety and other considerations, as previously described. If the computing system determines that the selected vehicle response mode should not be implemented, the computing system may communicate with a user via HMI 109 to inform the user that the previously selected vehicle response mode should not be implemented in the current or pending predefined driving situation. In addition, in block 1375, the computing system may query a vehicle user or occupant to determine if the user/occupant wishes to disable implementation of the selected vehicle response mode in the current or pending predefined driving situation. Blocks 1373 and 1375 may be executed simultaneously.

In block 1377, the computing system may determine if implementation of the selected vehicle response mode has been disabled, either by the computing system 14 or by a user.

If the selected vehicle response mode has been disabled, vehicle control may transfer (in block 1350) to the human driver in a semi-autonomous mode or manual mode. However, if the selected vehicle response mode has not been disabled, the computing system may implement (in block 1320) a computer-selected initial control mode associated with the computer-selected vehicle response mode for the latest predefined driving situation. To implement the selected initial control mode, the computing system may generate and implement vehicle control commands designed to generate the computer-selected initial indicators (for example, flashing headlights or operation of the vehicle horn) associated with the initial control mode.

In block 1325, the computing system may determine if the vehicle 11 is still in the latest predefined driving situation. The vehicle sensor data and other driving situation parameters may be monitored by the computing system on a continuous basis to detect a change in the driving situation as soon as it occurs. Changes in sensor data or parameters which may indicate a change in the driving situation may be monitored using sensors 28, and the computing system may be configured to interpret the information acquired to detect changes in the driving situation. The computing system may be configured to register a change in the driving situation responsive to an action by the other vehicle or person exterior of the vehicle 11. For example, in a situation where the vehicle 11 and another vehicle are both stopped at an intersection, the computing system may determine that the driving situation has changed when the other vehicle starts to proceed through the intersection after initiation of implementation of an initial vehicle response mode. In another example, in a situation such as that shown in FIGS. 5A-5D where a pedestrian is in the road ahead of the vehicle 11, the computing system may determine that the driving situation has changed when the pedestrian starts to proceed across the road after initiation of implementation of the initial control mode. Such changes in the driving situation may be interpreted by the computing system 14 as signs that the other person has perceived the initial indicators and has acknowledged the indicators by behaving in a manner desired and anticipated by the user. Similarly, if no movement of the other vehicle or pedestrian is detected after initiation of implementation of the initial control mode, the computing system may determine that the other person has not perceived the initial indicators or, for some other reason, is not responding to the indicators in the manner intended by the user of vehicle 11.

In block 1330, if the vehicle 11 is still in the latest user-selected predefined driving situation, the computing system may determine if a first predetermined time period has expired after initiation of implementation of the initial control mode. If the vehicle 11 is still in the latest predefined driving situation and the first predetermined time period has not expired after initiation of implementation of the initial control mode, the computing system may continue with implementation of the initial control mode as described in block 1320.

In block 1335, if the vehicle 11 is still in the latest predefined driving situation and the computing system determines that the first predetermined time period has expired, the predefined driving situation has not changed during the time period after initiation of implementation of the initial control mode. Then, in block 1335, if the vehicle 11 is still in the latest predefined driving situation and the computing system determines that the first predetermined time period has expired, the computing system may implement a computer-selected secondary control mode associated with the vehicle response mode for the latest predefined driving situation, instead of implementing the initial control mode. The secondary control mode may comprise the secondary indicators selected by the computing system in block 1372.

In one or more arrangements, the secondary control mode may specify the same indicators and at the same intensity levels as specified by the computer-selected initial control mode. Thus, the secondary control mode may be implemented by continuing generation of the indicators and at the same intensity levels found in the initial control mode.

In one or more arrangements, the secondary control mode may specify one or more of the same indicators as the initial control mode, at different intensity levels than those specified in the initial control mode. Thus, the secondary control mode may be implemented by continuing generation of one or more of the indicators found in the initial control mode, but also by varying the intensity level of one or more indicators. For example, where flashing of vehicle headlights 73 intermittently on and off at a first, relatively slower rate is specified as an initial indicator, flashing of the vehicle headlights 73 intermittently on and off at a second, relatively faster rate may be specified as an secondary indicator, as a further attempt to attract the attention of the person exterior of the vehicle, and to emphasize the user's intended response to the latest predefined driving situation.

In one or more arrangements, the secondary control mode may specify the some (or none) of the same indicators as the initial control mode, and also one or more additional or different indicators. Thus, the secondary control mode may be implemented by continuing generation of one or more initial indicators specified in the initial control mode, and also by generating the additional or different indicators. For example, where flashing of vehicle headlights intermittently on and off is specified as an initial indicator, both flashing of the vehicle headlights intermittently on and off and operation of the vehicle horn to produce a sound may be specified as secondary indicators, as a further attempt to attract the attention of the person exterior of the vehicle, and to emphasize the user's intended response to the latest predefined driving situation.

In block 1340, the computing system may is determine if the vehicle 11 is still in the latest predefined driving situation. If the vehicle 11 is still in the latest predefined driving situation, the computing system may (in block 1345) determine if a second predetermined time period has expired after initiation of implementation of the secondary control mode. If the vehicle 11 is still in the latest predefined driving situation and the second predetermined time period has not expired after initiation of implementation of the secondary control mode, the computing system may continue with implementation of the secondary control mode as described in block 1335.

However, if the vehicle 11 is still in the latest predefined driving situation and the second predetermined time period has expired after initiation of implementation of the secondary control mode, the computing system may determine that the person exterior of the vehicle still has not perceived the initial and/or secondary indicators or, for some other reason, does not plan to respond to the indicators in the desired manner. In this case, the computing system may (in block 1350) discontinue implementation of the conditional secondary control mode (i.e., halt generation of the secondary indicators) and transfer vehicle control to the human driver, in a manual or semi-autonomous driving mode.

Returning to block 1325, if the vehicle 11 is not still in the latest user-selected predefined driving situation, the computing system may determine (in block 1355) if the vehicle 11 is currently in another user-selected predefined driving situation. The other user-selected predefined driving situation may be a situation of the same type, or the other situation may be a situation of a different type.

The computing system may be configured to, if the vehicle 11 is in another user-selected predefined driving situation, implement a computer-selected vehicle response mode associated with the other user-selected predefined driving situation. The vehicle response mode associated with the other user-selected predefined driving situation may include an initial control mode specifying one or more computer-selected initial indicators of the selected vehicle response mode associated with the other user-selected predefined driving situation. The vehicle response mode associated with the other user-selected predefined driving situation may also include a conditional secondary control mode specifying one or more computer-selected secondary indicators of the computer-selected vehicle response mode associated with the other user-selected predefined driving situation. The one or more initial indicators and the one or more secondary indicators of the selected vehicle response mode associated with the other user-selected predefined driving situation may be configured to be perceivable by a person exterior of the vehicle.

If the vehicle 11 is currently in another user-selected predefined driving situation, the computing system may (in block 1360) set the other user-specified predefined driving situation as the new latest user-specified predefined driving situation, for purposes of responding to the driving situation in accordance with an associated computer-selected response mode. Control may then proceed to block 1317, where a vehicle response mode for the latest (other) predefined driving situation is determined by the computing system.

However, if it is determined that the vehicle 11 is not in another user-selected predefined driving situation, implementation of the initial control mode may be discontinued (i.e., generation of the initial indicators halted) and control may transfer (in block 1350) to the human driver in a manual or semi-autonomous driving mode.

FIG. 8B is a flow diagram illustrating implementation of the initial control mode in block 1320 and implementation of the secondary control mode in block 1335 as described above. As stated previously, the initial control mode may be implemented by generating initial indicators either by autonomously control portions of vehicle (in block 1320*b*) or by prompting the human driver (through haptic or other feedback) to control the vehicle so as to generate the initial indicators (in block 1320*a*). Similarly, the secondary control mode may be implemented by generating secondary indicators either by autonomously control portions of vehicle (in block 1335*b*) or by prompting the human driver to control the vehicle so as to generate the initial indicators (in block 1335*a*). Haptic feedback to the driver may be generated through such elements as the steering wheel, the brake and accelerator pedals, the vehicle seat, and any other portion of the vehicle normally in contact with the driver. In addition, other types of feedback (such as auditory or visual) may be provided via HMI 109 or other means. The other types of feedback may prompt driver operation of other vehicle elements or systems so as to generate one or more initial or secondary indicators. For example, an auditory message may be generated through the HMI prompting the driver to flash the vehicle headlights as an initial or secondary indicator of the vehicle response mode.

As an example, in FIGS. 5A-5B, the computing system may generate haptic feedback to the human driver through the accelerator pedal 20*a* and/or brake pedal 22*a* directed to prompting the driver to remove pressure from the accelerator pedal 20*a* and to apply pressure to the brake pedal 22*a* sufficient to stop the vehicle 11 at or about a distance d1 from the pedestrian 502. As shown in FIG. 5c, the computing system may then operate the headlights 73 to indicate to the pedestrian 502 that the vehicle 11 will remain stopped and that the pedestrian is to proceed across the street.

Figure 6A:
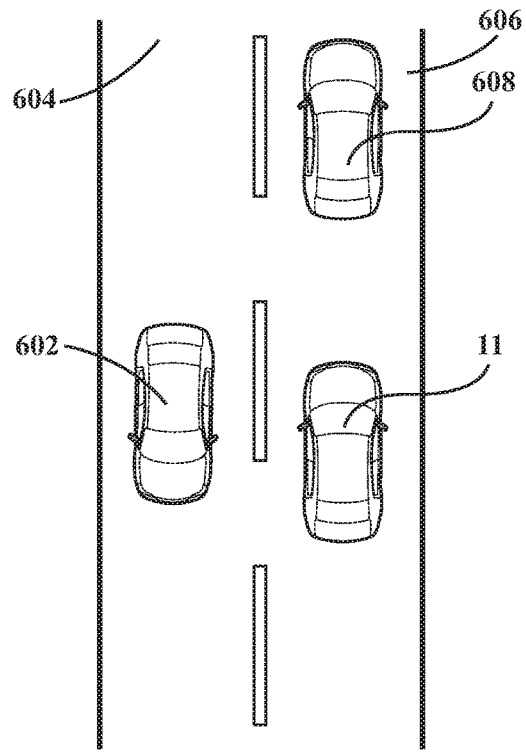
FIG. 6A is a plan schematic view showing a second example of a predefined driving situation to which a vehicle 11 may be configured to respond.
Figure 6B:
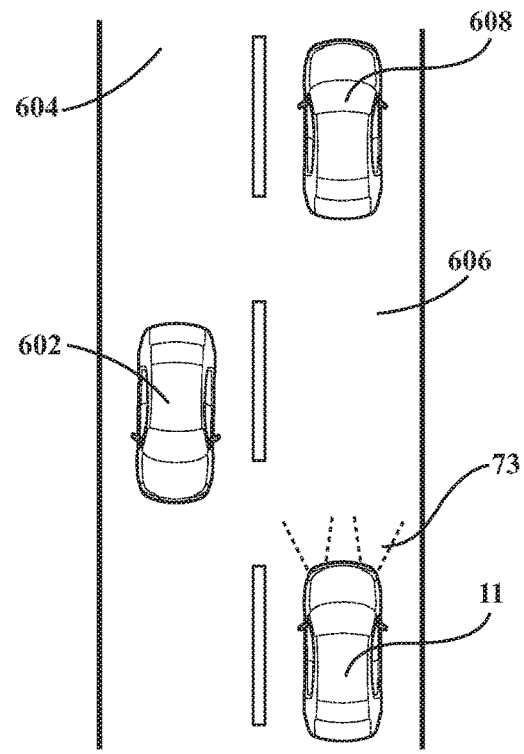
FIG. 6B is the view of FIG. 6A showing the vehicle 11 increasing a following distance and intermittently flashing headlights as initial indicators of an intended vehicle response mode in responding to the predefined driving situation of FIG. 6A.
Figure 6C:
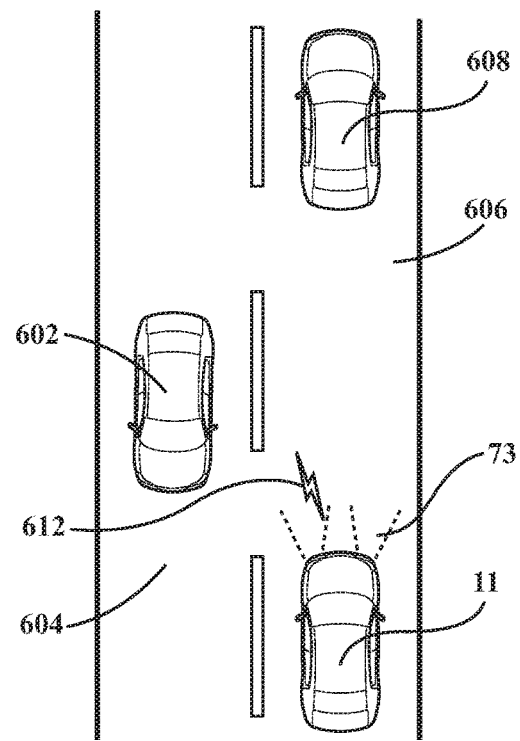
FIG. 6C is the view of FIG. 6A showing the vehicle 11 intermittently flashing headlights and operating the vehicle horn as secondary indicators of an intended vehicle response mode in responding to the predefined driving situation of FIG. 6A.
Figure 6D:
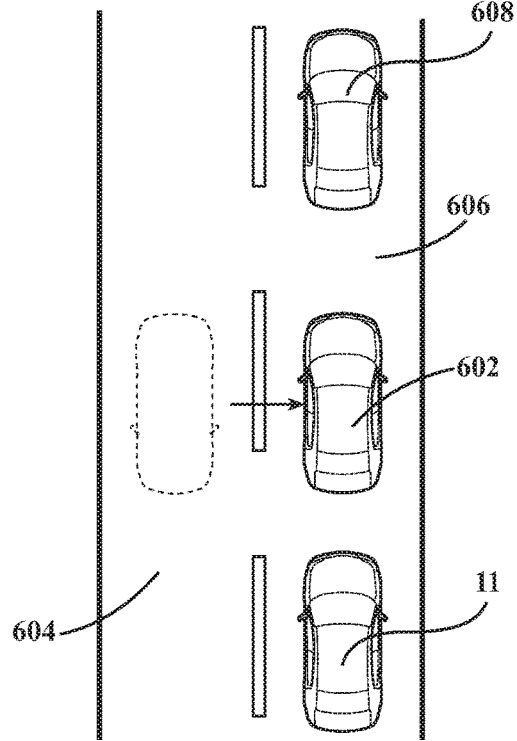
FIG. 6D is the view of FIG. 6A showing the vehicle 602 responding to the secondary indicators of FIG. 6C.

In another example, in FIGS. 6A and 6B, the computing system may generate haptic feedback to the human driver through the accelerator pedal 20*a* and/or brake pedal 22*a* to urge the human driver to reduce pressure on the accelerator so that the vehicle 11 slows and the following distance behind vehicle 608 increases. The computing system may generate haptic feedback to the human driver through the accelerator pedal 20*a* and/or brake pedal 22*a* to urge the human driver to maintain this increased following distance. The computing system may also (in FIG. 6B) operate the vehicle headlights to further indicate to the driver of vehicle 602 that he is to change lanes from lane 604 to lane 606.

Also, in parallel with the steps 1310-1377 just described, the computing system 14 may be configured to monitor for user selection of the vehicle response mode user interrupt function previously described. That is, simultaneously with initiation of implementation of the vehicle response mode in block 1320, the computing system may (in block 1307) display for user selection an interactive prompt enabling selection of the user interrupt. During execution of the other blocks shown in FIGS. 8 and 8A, the computing system may continuously monitor for user selection of the interrupt. As soon as the interrupt is selected (if it is selected), the computing system may immediately (in block 1308) discontinue implementation of the vehicle response mode and transfer vehicle control (in block 1350) to a human driver.

As will be appreciated by one skilled in the pertinent art upon reading the preceding disclosure, various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media for executing the functions described herein. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

It should be understood that the preceding is merely a detailed description of various embodiments of this invention and that numerous changes to the disclosed embodiments can be made in accordance with the disclosure herein without departing from the spirit or scope of the invention. Thus, the disclosure is not to be limited to these embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A computing system for a vehicle, the computing system comprising one or more processors for controlling operation of the computing system, and a memory for storing data and program instructions usable by the one or more processors, wherein the one or more processors are configured to execute instructions stored in the memory to:
    determine when the vehicle is currently in a user-selected predefined driving situation;
    in one operational mode, responsive to a determination that the vehicle is currently in a user-selected predefined driving situation:
    control operation of the vehicle to implement a computer-selected vehicle response mode associated with the user-selected predefined driving situation by:
        controlling operation of the vehicle to generate one or more computer system-selected initial indicators of the selected vehicle response mode; and
        controlling operation of the vehicle to generate haptic feedback to a human driver of the vehicle, the haptic feedback being configured to prompt the human driver to operate at least one portion of the vehicle to generate one or more other computer system-selected initial indicators of the vehicle response mode,
        each of the one or more initial computer system-selected indicators being configured to be perceivable by a person exterior of the vehicle,
    the one or more processors being configured to execute instructions stored in the memory to, in another operational mode:
    responsive to a determination that the vehicle is currently in a user-selected predefined driving situation, control operation of the vehicle to generate one or more user-selected initial indicators of a user-selected predetermined-vehicle response mode associated with the user-selected predefined driving situation;
    responsive to expiration of a first predetermined time period following initiation of generation of the one or more user-selected initial indicators, determine if the vehicle is still in the user-selected predefined driving situation; and
    responsive to a determination that the vehicle is still in the user-selected predefined driving situation after expiration of the first predetermined time period, control operation of the vehicle to generate one or more user-selected secondary indicators of the user-selected vehicle response mode,
    wherein the one or more user-selected initial indicators and the one or more user-selected secondary indicators are configured to be perceivable by a person exterior of the vehicle.

2. The computing system of claim 1 wherein the one or more processors are configured to execute instructions stored in the memory to, responsive to the determination that the vehicle is currently in the user-selected predefined driving situation and prior to controlling operation of the vehicle to implement a vehicle response mode:
    select the vehicle response mode to be associated with the user-selected predefined driving situation;
    select one or more initial indicators of the vehicle response mode; and
    select one or more secondary indicators of the vehicle response mode.

3. The computing system of claim 1 wherein the one or more processors are configured to execute instructions stored in the memory to, prior to a determination that the vehicle is currently in the user-selected predefined driving situation:
    enable user selection of the predefined driving situation;
    enable user selection of a vehicle response mode to provide a user-selected predetermined vehicle response mode associated with the user-selected predefined driving situation;
    enable user selection of at least one initial indicator to be autonomously generated by control of the vehicle by the computing system during implementation of the user-selected predetermined vehicle response mode; and
    enable user selection of at least one secondary indicator to be autonomously conditionally generated by control of the vehicle by the computing system during implementation of the user-selected predetermined vehicle response mode.

4. The computing system of claim 1 wherein the one or more processors are configured to execute instructions stored in the memory to enable a user to select the first predetermined time period.

5. The computing system of claim 1 wherein the one or more processors are configured to execute instructions stored in the memory to autonomously control the vehicle to intermittently flash vehicle headlights on and off at a first rate as an initial indicator of the vehicle response mode, when flashing of the vehicle headlights on and off at the first rate is specified as an initial indicator.

6. The computing system of claim 5 wherein the one or more processors are configured to execute instructions stored in the memory to autonomously control the vehicle to intermittently flash the vehicle headlights on and off at a second rate greater than the first rate, as a secondary indicator of the vehicle response mode, when flashing of the vehicle headlights on and off at the second rate is specified as an secondary indicator.

7. The computing system of claim 1 wherein the one or more processors are configured to execute instructions stored in the memory to autonomously control the vehicle to stop the vehicle as an initial indicator of the vehicle response mode, when stopping of the vehicle is specified as an initial indicator.

8. The computing system of claim 7 wherein the one or more processors are configured to execute instructions stored in the memory to autonomously control the vehicle to maintain the vehicle in a stopped condition as a secondary indicator of the vehicle response mode, when maintaining of the vehicle is a stopped condition is specified as a secondary indicator.

9. The computing system of claim 1 wherein the one or more processors are configured to execute instructions stored in the memory to autonomously control the vehicle to operate a horn of the vehicle as an indicator of the vehicle response mode, when operation of the horn is specified as a secondary indicator.

10. A computer-implemented method for controlling a vehicle for generating one or more indicators of a vehicle response mode to be implemented by the vehicle responsive to a determination that the vehicle is currently in a user-selected predefined driving situation, the method comprising steps of:
  determining that the vehicle is currently in a user-selected predefined driving situation;
  controlling operation of the vehicle to generate one or more computer system-selected initial indicators of a vehicle response mode associated with the user-selected predefined driving situation; and
  controlling operation of the vehicle to generate haptic feedback to a human driver of the vehicle, the haptic feedback being configured to prompt the human driver to operate at least one portion of the vehicle to generate one or more other computer system-selected initial indicators of the vehicle response mode,
  each of the one or more computer system-selected initial indicators being configured to be perceivable by a person exterior of the vehicle,
  in another operational mode:
  responsive to a determination that the vehicle is currently in a user-selected predefined driving situation, control operation of the vehicle to generate one or more user-selected initial indicators of a user-selected predetermined-vehicle response mode associated with the user-selected predefined driving situation;
  responsive to expiration of a first predetermined time period following initiation of generation of the one or more user-selected initial indicators, determine if the vehicle is still in the user-selected predefined driving situation; and
  responsive to a determination that the vehicle is still in the user-selected predefined driving situation after expiration of the first predetermined time period, control operation of the vehicle to generate one or more user-selected secondary indicators of the user-selected vehicle response mode,
  wherein the one or more initial indicators and the one or more user-selected secondary indicators are configured to be perceivable by a person exterior of the vehicle.

11. The method of claim 10 further comprising the step of, prior to the step of generating the one or more initial indicators, determining one or more initial indicators responsive to at least one of a vehicle operational status and conditions in an external environment of the vehicle.

12. The method of claim 10 further comprising the step of controlling operation of the vehicle to continue to generate the haptic feedback after activation of an interrupt configured to interrupt control of operation of the vehicle to generate one or more computer system-selected initial indicators of the selected vehicle response mode.

13. The method of claim 10 further comprising the steps of:
  determining, after initiation of generation of the initial indicators, if the vehicle is still in the user-selected predefined driving situation;
  if the vehicle is still in the user-selected predefined driving situation after initiation of generation of the initial indicators, determining if a first predetermined time period has passed following initiation of generation of the initial indicators;
  if the first predetermined time period has not passed following initiation of generation of the initial indicators, continuing to control operation of the vehicle to generate one or more initial indicators of the vehicle response mode and to generate haptic feedback to the human driver to prompt the human driver to operate at least one portion of the vehicle to generate one or more initial indicators of the vehicle response mode; and
  if the first predetermined time period has passed following initiation of generation of the initial indicators;
  controlling operation of the vehicle to generate one or more computer system-selected secondary indicators of the vehicle response mode associated with the user-selected predefined driving situation; and
  controlling operation of the vehicle to generate haptic feedback to the human driver, the haptic feedback being configured to prompt the human driver to operate at least one portion of the vehicle to generate one or more computer system-selected secondary indicators of the vehicle response mode, wherein the one or more secondary indicators are configured to be perceivable by a person exterior of the vehicle.

14. The method of claim 13 further comprising the steps of:
  determining, after initiation of generation of the secondary indicators, if the vehicle is still in the user-selected predefined driving situation;
  if the vehicle is still in the user-selected predefined driving situation after initiation of generation of the secondary indicators, determining if a second predetermined time period has passed following initiation of generation of the secondary indicators;
  if the second predetermined time period has not passed following initiation of generation of the secondary indicators, continuing generation of the secondary indicators; and if the second predetermined time period has passed following initiation of generation of the secondary indicators, discontinuing generation of the secondary indicators.

15. The method of claim 13 further comprising the steps of:
if the vehicle is not still in the user-selected predefined driving situation after initiation of generation of the initial indicators, determining if the vehicle is currently in another user-selected predefined driving situation;
if the vehicle is not currently in another user-selected predefined driving situation, discontinuing generation of the initial indicators;
if the vehicle is currently in another user-selected predefined driving situation, determining a vehicle response mode to be implemented in response to the determination that the vehicle is in the other user-selected predefined driving situation; and
generating one or more initial indicators of the vehicle response mode to be implemented in response to the determination that the vehicle is in the other user-selected predefined driving situation.

16. The computing system of claim 1 wherein the one or more processors are configured to execute instructions stored in the memory to:
evaluate current vehicle and/or environmental conditions prior to autonomous implementation of a computer-selected vehicle response mode; and
responsive to current vehicle and/or environmental conditions, forego implementation of the computer-selected vehicle response mode.

17. The computing system of claim 1 wherein the one or more processors are configured to execute instructions stored in the memory to, in the one operational mode:
responsive to expiration of a first predetermined time period following initiation of generation of one or more initial indicators, determine if the vehicle is still in the user-selected predefined driving situation;
responsive to a determination that the vehicle is still in the user-selected predefined driving situation after expiration of the first predetermined time period:
control operation of the vehicle to generate one or more computer system-selected secondary indicators of the selected vehicle response mode; and
control operation of the vehicle to generate haptic feedback to a human driver of the vehicle, the haptic feedback being configured to prompt the human driver to operate at least one portion of the vehicle to generate one or more computer system-selected secondary indicators of the computer system-selected vehicle response mode,
the one or more secondary indicators being configured to be perceivable by a person exterior of the vehicle.

18. The computing system of claim 17 wherein the one or more processors are configured to execute instructions stored in the memory to discontinue generation of the one or more secondary indicators of the vehicle response mode and generation of the haptic feedback to the human driver of the vehicle responsive to a determination that the vehicle is still in the user-selected predefined driving situation after expiration of a second predetermined time period following initiation of generation of the one or more secondary indicators of the selected vehicle response mode.

19. The computing system of claim 17 wherein the one or more processors are configured to execute instructions stored in the memory to, responsive to a determination that the vehicle is not still in the user-selected predefined driving situation after expiration of the first predetermined time period following initiation of generation of the one or more initial indicators, determine if the vehicle is currently in another user-selected predefined driving situation; and
responsive to a determination that the vehicle is currently in another user-selected predefined driving situation, control operation of the vehicle to implement a vehicle response mode associated with the other user-selected predefined driving situation, the vehicle response mode associated with the other user-selected predefined driving situation including an initial control mode specifying one or more initial indicators of the vehicle response mode associated with the other user-selected predefined driving situation, and a conditional secondary control mode specifying one or more secondary indicators of the vehicle response mode associated with the other user-selected predefined driving situation, wherein the one or more initial indicators and the one or more secondary indicators of the vehicle response mode associated with the other user-selected predefined driving situation are configured to be perceivable by a person exterior of the vehicle.

20. The computing system of claim 1 wherein the one or more processors are configured to execute instructions stored in the memory to:
enable, at any time during implementation of the selected vehicle response mode, user activation of a user interrupt configured to interrupt computer system control of operation of the vehicle to implement the selected vehicle response mode; and
control operation of the vehicle to continue to generate, after activation of the interrupt, any haptic feedback being generated prior to activation of the interrupt.

21. A computer-implemented method for controlling a vehicle when the vehicle is in a user-selected predefined driving situation, comprising steps of:
in a computer-selected vehicle response mode associated with the driving situation:
controlling operation of the vehicle to generate a perceivable computer system-selected initial indicator of a vehicle response mode; and
controlling operation of the vehicle to generate haptic feedback to a driver of the vehicle, to prompt the driver to operate the vehicle to generate another perceivable computer system-selected initial indicator of the response mode;
in a user-selected vehicle response mode associated with the driving situation:
controlling operation of the vehicle to generate a perceivable user-selected initial indicator of the response mode;
responsive to a determination that the vehicle is still in the driving situation after expiration of a first predetermined time period following initiation of generation of the user-selected initial indicator, control operation of the vehicle to generate a perceivable user-selected secondary indicator of the response mode.

22. The method of claim 21 further comprising the step of, prior to the step of controlling operation of the vehicle to generate an initial indicator in any of the computer-selected vehicle response mode and the user-selected vehicle response mode, determining the initial indicator responsive to at least one of a vehicle operational status and conditions in an external environment of the vehicle.

23. The method of claim 21 further comprising the step of controlling operation of the vehicle to continue to generate the haptic feedback after activation of an interrupt configured to interrupt control of operation of the vehicle to generate a computer system-selected initial indicator of the selected vehicle response mode.

\* \* \* \* \*